US012745196B2

(12) United States Patent
Yoshimura et al.

(10) Patent No.: US 12,745,196 B2

(45) Date of Patent: Sep. 22, 2026

(54) COMMUNICATIONS NETWORK AND METHODS WITH WIRELESS COMMUNICATION

(71) Applicant: Sharp Kabushiki Kaisha, Sakai City (JP)

(72) Inventors: Tomoki Yoshimura, Camas, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 366 days.

(21) Appl. No.: 18/217,203

(22) Filed: Jun. 30, 2023

(65) Prior Publication Data

US 2025/0008456 A1 Jan. 2, 2025

(51) Int. Cl.

*H04W 56/00* (2009.01)

*H04W 76/20* (2018.01)

(52) U.S. Cl.

CPC ....... *H04W 56/0015* (2013.01); *H04W 76/20* (2018.02)

(58) Field of Classification Search

CPC .......................... H04W 56/0015; H04W 76/20

USPC .......................................................... 370/329

See application file for complete search history.

(56) References Cited

U.S. PATENT DOCUMENTS

2019/0319692 A1* 10/2019 Noh ...................... H04L 5/0048
2021/0306863 A1* 9/2021 Wu ....................... H04W 16/14
2022/0116968 A1* 4/2022 Choi ................. H04W 72/1268
2022/0322252 A1* 10/2022 Chen ................. H04W 72/0446
2023/0007641 A1* 1/2023 Kim .................... H04W 72/044
2023/0189308 A1* 6/2023 Choi ................. H04W 74/0833
2023/0224837 A1* 7/2023 Choi ................. H04W 72/1268
2023/0247627 A1* 8/2023 Choi .......................... H04L 1/08
2024/0056223 A1* 2/2024 Liang ................ H04W 72/1268
2024/0147447 A1* 5/2024 Wu ........................... H04L 5/16

OTHER PUBLICATIONS

MCC Support, "Draft Report of 3GPP TSG RAN WG1 #113 v0.1.0 (Incheon, South Korea, May 22-26, 2023)", 3GPP TSG RAN WG1 Meeting #114, R1-230xxxx, Aug. 25, 2023.

* cited by examiner

*Primary Examiner* — Robert J Lopata

(74) *Attorney, Agent, or Firm* — Austin Rapp

(57) ABSTRACT

A terminal device is described. The terminal device includes receiving circuitry configured to receive a downlink (DL) channel to convey a first one or more radio resource control (RRC) parameters to indicate a location of an uplink (UL) subband in a time domain and a second one or more RRC parameters to indicate a location of one or more synchronization signal/physical broadcast channel (SS/PBCH) blocks. The terminal device also includes processing circuitry configured to configure the UL subband based on the first one or more RRC parameters, and configured to drop transmission of a physical uplink channel if the physical uplink channel is placed in a region including at least one SS/PBCH block from the one or more SS/PBCH blocks.

3 Claims, 20 Drawing Sheets

Figure 2A: Number of OFDM symbols per slot, slots per frame, and slots per subframe for normal cyclic prefix

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2B: Number of OFDM symbols per slot, slots per frame, and slots per subframe for extended cyclic prefix

| u | $N^{slot}_{symb}$ | $N^{frame,u}_{slot}$ | $N^{subframe,u}_{slot}$ |
|---|---|---|---|
| 2 | 12 | 40 | 4 |

FIG. 2

COMMUNICATIONS NETWORK AND METHODS WITH WIRELESS COMMUNICATION

TECHNICAL FIELD

The present disclosure relates generally to communication systems. More specifically, the present disclosure relates to communications networks and methods with wireless communication.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIGS. 2A and 2B are tables illustrating parameters related to SCS-specific carriers according to an aspect of the present embodiment;

DETAILED DESCRIPTION

Figure 1:
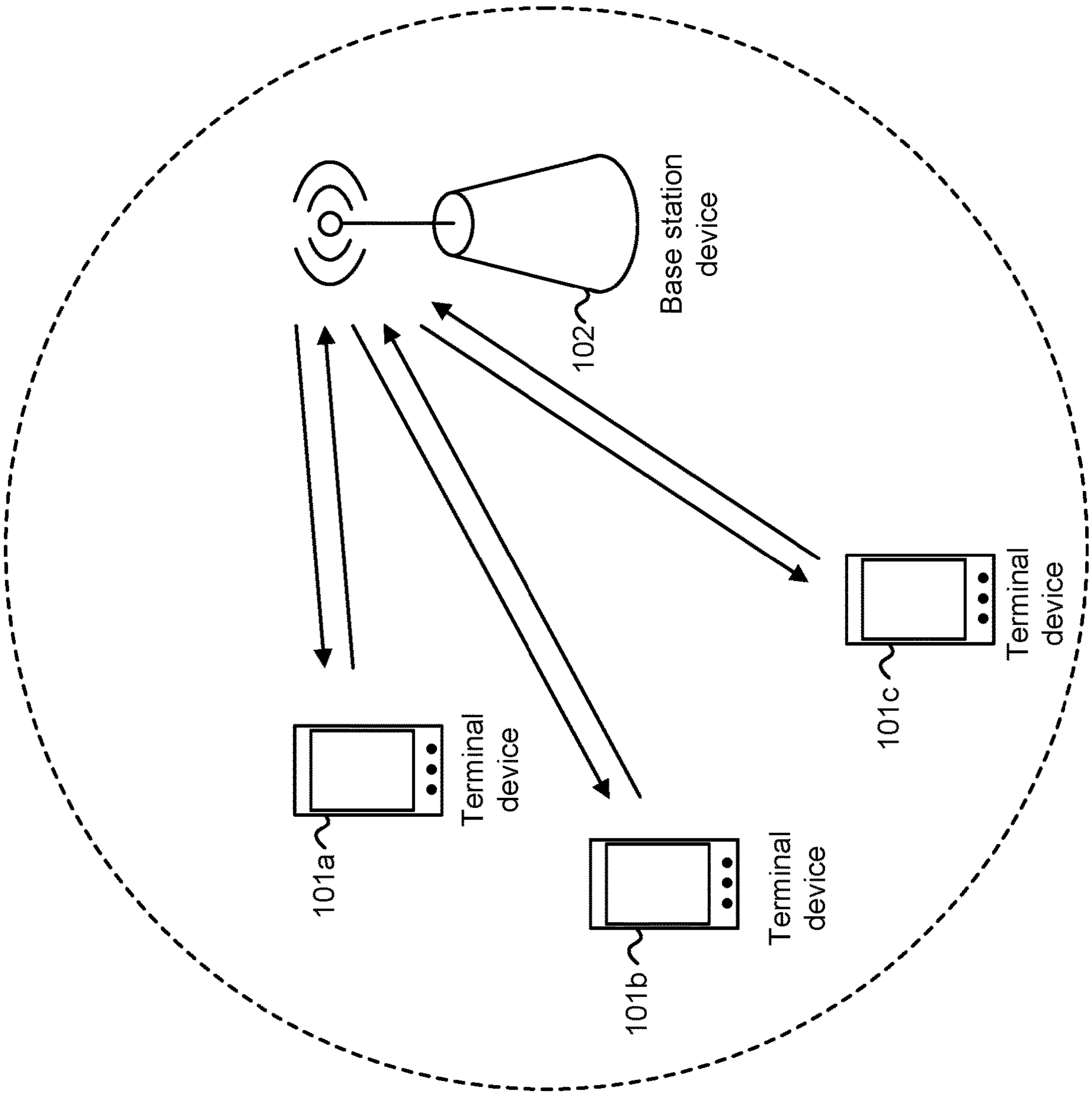
FIG. 1 is a block diagram illustrating a wireless communication system according to an aspect of the present embodiment.

A terminal device is described. The terminal device includes receiving circuitry configured to receive a downlink (DL) channel to convey a first one or more radio resource control (RRC) parameters to indicate a location of an uplink (UL) subband in a time domain and a second one or more RRC parameters to indicate a location of one or more synchronization signal/physical broadcast channel (SS/PBCH) blocks. The terminal device also includes processing circuitry configured to configure the UL subband based on the first one or more RRC parameters, and configured to drop transmission of a physical uplink channel if the physical uplink channel is placed in a region including at least one SS/PBCH block from the one or more SS/PBCH blocks. A length of the region may be larger than a length of the at least one SS/PBCH block.

The processing circuitry may further be configured to determine a duration as a period of the UL subband if at least one SS/PBCH block is placed in the duration. In some examples, the processing circuitry is further configured to determine a duration as the duration of a slot where the at least one SS/PBCH block is mapped.

In another example, the processing circuitry is further configured to determine a duration starts at a first slot where a first SS/PBCH block is mapped and ends at a last slot where a last SS/PBCH block is mapped in a period of the UL subband. In yet another example, the processing circuitry is further configured to determine a duration starts at a first orthogonal frequency division multiplex (OFDM) symbol where a first SS/PBCH block is mapped and ends at a last OFDM symbol where a last SS/PBCH block is mapped in a period of the UL subband.

The processing circuitry may be further configured to determine a duration starts at a first number of orthogonal frequency division multiplex (OFDM) symbols earlier than a first OFDM symbol where a first SS/PBCH block is mapped and ends at a second number of OFDM symbols later than a last OFDM symbol where a last SS/PBCH block is mapped in a period of the UL subband.

A base station is described. The base station includes transmitting circuitry configured to transmit a downlink (DL) channel to convey a first one or more radio resource control (RRC) parameters to indicate a location of an uplink (UL) subband in a time domain and a second one or more RRC parameters to indicate a location of one or more synchronization signal/physical broadcast channel (SS/PBCH) blocks. The base station also includes processing circuitry configured to configure the UL subband based on the first one or more RRC parameters, and configured to assume a drop of transmission of a physical uplink channel if the physical uplink channel is placed in a region including at least one SS/PBCH block from the one or more SS/PBCH blocks. A length of the region may be larger than a length of the at least one SS/PBCH block.

A method by a terminal device is described. The method includes receiving a downlink (DL) channel to convey a first one or more radio resource control (RRC) parameters to indicate a location of an uplink (UL) subband in a time domain and a second one or more RRC parameters to indicate a location of one or more synchronization signal/physical broadcast channel (SS/PBCH) blocks. The method also includes configuring the UL subband based on the first one or more RRC parameters. The method additionally includes dropping transmission of a physical uplink channel if the physical uplink channel is placed in a region including at least one SS/PBCH block from the one or more SS/PBCH blocks.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and/or other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a terminal device, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE", "wireless communication device" and "terminal device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In 5G NR, different services may be supported with different QoS requirements (e.g., reliability and/or delay tolerance). For example, eMBB is targeted for high data rate, and URLLC is targeted for ultra-reliability and low latency.

To support ultra-low latency, more than one HARQ-ACK feedback in a slot may be configured for URLLC services. In some approaches, two or more HARQ-ACK codebooks may be simultaneously constructed for different service types. The PUCCH for URLLC HARQ-ACK may be used to transmit HARQ-ACK in a sub-slot level. Furthermore, the PUCCH for URLLC HARQ-ACK may be enhanced with ultra-reliability (e.g., with BLER of 10-6 instead of a0-2. Some of the techniques described herein may include some aspects of SPS HARQ-ACK deferral, available PUCCH resource determination, and/or priority determination for deferred SPS HARQ-ACK, etc.

From a UCI multiplexing point of view, the HARQ-ACK is one UCI type (e.g., it may or may not be necessary to differentiate between SPS HARQ-ACK and non-SPS HARQ-ACK in some approaches). Some of the examples described herein may include up to 2 bits of HARQ-ACK reporting using bundling, etc. In some examples, UCI multiplexing may be utilized for more than 2 bits of total payload. Some examples of the techniques described herein may be utilized for PUCCH format 2/3/4 cases. In some approaches, joint coding and/or separate coding may be supported.

Some examples of the techniques described herein may support cases such as deferred SPS HARQ-ACK and non-deferred HARQ-ACK with the same priority. Some examples of the techniques described herein may include similar behaviors for UCI multiplexing. For example, multiplexing of different UCI of the same priority may be enabled for low priority (LP) HARQ-ACK, LP SR, and CSI, and for high priority (HP) HARQ-ACK with HP SR. Other cases for UCI multiplexing may include HP HARQ-ACK with LP HARQ-ACK, HP HARQ-ACK with HP SR and with LP HARQ-ACK, and HP SR with LP HARQ-ACK.

Deferred and non-deferred HARQ-ACKs with the same priority in the same slot/sub-slot is an issue. In some examples of the techniques described herein, for codebook generation, the SPS and normal HARQ-ACK may be multiplexed in the same HARQ-ACK codebook if their timings point to the same slot/sub-slot. In some examples, deferred SPS HARQ-ACK may have a different timing indication, may be postponed, and/or may be addressed with a separate codebook (e.g., basically a separate codebook). In some examples, two codebooks with the same priority may be maintained at the same time. In some examples, multiplexing may be considered as maintaining one codebook (e.g., only one codebook).

In NR release-17, HARQ-ACK multiplexing with different priorities on PUCCH may be supported. Both joint coding and separate coding methods may be taken into account. Some examples of joint coding methods for multiplexing of HARQ-ACK with different priorities are discussed. For example, when the payload size is small, joint coding may be performed.

In a first aspect, methods are described for HARQ-ACK multiplexing when the number of HARQ-ACK is no more than 2 bits for both high priority HARQ-ACK and low priority HARQ-ACK. In this case, it may be desirable to keep sequence based PUCCH format 0 or PUCCH format 1 for its reliability and resource efficiency.

In a second aspect, joint coding methods are described when the high priority HARQ-ACK and low priority HARQ-ACK are concatenated into a single joint HARQ-ACK coding book for PUCCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

Some mathematical expressions are provided that may be used with the disclosure herein.

Floor (CX) represents a floor function for the real number CX. For example, floor (CX) may represent a function that provides the largest integer within a range that does not exceed the real number CX.

Ceil (DX) represents a ceiling function to a real number DX. For example, ceil (DX) may be a function that provides the smallest integer within the range not less than the real number DX.

Mod (EX, FX) represents a function that provides the remainder obtained by dividing EX by FX.

Exp (GX) represents e^GX. Here, e is the Napier number. Also, (HX)^(IX) indicates IX to the power of HX.

According to one aspect of the present embodiment, a waveform formed based on OFDM (Orthogonal Frequency Division Multiplex) may be used in a wireless communication system. OFDM symbol defines a unit in the time domain of the waveform. Each OFDM symbol is converted to a time-continuous signal in baseband signal generation. For example, CP-OFDM (Cyclic Prefix-Orthogonal Frequency Division Multiplex) may be used in the downlink direction of the wireless communication system. For example, either CP-OFDM or DFT-s-OFDM (Discrete Fourier Transform-spread-Orthogonal Frequency Division Multiplex) may be used in the uplink direction of the wireless communication system.

FIG. 1 is a diagram of a wireless communication system according to an aspect of the present embodiment. In FIG. 1, the wireless communication system is comprised of terminal devices 101*a*, 101*b*, 101*c* and base station device 102. Hereinafter, terminal devices 101*a*-101*c* may be referred to as terminal device 101, user equipment 101 or UE 101.

Base station 102 is comprised of one or more transmission/reception devices. When base station 102 is configured by a plurality of transmission/reception devices, each of the plurality of transmission/reception devices may be arranged at a different position. A transmission/reception device is comprised of one or both of a transmission device and a reception device.

The base station 102 is configured to serve wireless communication in terms of one or more cells. A cell is defined as a set of resources used for wireless communication. For example, a cell comprises one or both of a downlink component carrier and an uplink component carrier. For example, a serving cell may be comprised of a downlink component carrier and two or more uplink component carriers. A downlink component carrier and an uplink component carrier are also referred to as component carriers.

Further explanations and diagrams of a terminal device 101 and a base station 102 are provided below.

One or more subcarrier spacing (SCS) specific carriers are associated with one component carrier. Each SCS-specific carrier may define a carrier for a subcarrier-spacing configuration u. For example, one SCS-specific carrier may be associated with either a downlink component carrier or an uplink component carrier. In another example, one SCS-specific carrier may be associated with both a downlink component carrier and an uplink component carrier.

FIG. 2 is an example showing parameters related to SCS-specific carriers according to an aspect of the present embodiment. In FIG. 2A, for example, when the subcarrier-spacing configuration u is set to 2 and the CP configuration is set to normal CP (Cyclic Prefix), the parameters are set to $N^{slot}_{symb}=14$, $N^{frame,u}_{slot}=40$, and $N^{subframe,u}_{slot}=4$. Further, in FIG. 2B, for example, when the subcarrier-spacing configuration u is set to 2 and the CP configuration is set to an extended CP, the parameters are set to $N^{slot}_{symb}=12$, $N^{frame,u}_{slot}=40$, $N^{subframe,u}_{slot}=4$.

$N^{slot}_{symb}$ represents the number of OFDM symbols in a slot. $N^{frame,u}_{slot}$ represents the number of slots in a radio frame. $N^{subframe,u}_{slot}$ represents the number of slots in a subframe.

Time unit $T_c$ represents the length of the time domain. The time unit $T_c$ calculated by $1/(df_{max}*N_f)$ where $df_{max}$ represents 480 kHz and $N_f=4096$. The constant k is calculated by $df_{max}*N_f/(df_{ref}N_{f,ref})$. The constant k is 64 when $df_{ref}$ is 15 kHz and $N_{f,ref}$ is 2048.

Transmission of signals in the downlink and/or transmission of signals in the uplink may be organized into radio frames (or system frames, frames) of length $T_f$. $T^f$ is calculated by $(df_{max}N_f/100)*T_s$ and $(df_{max}N_f/100)*T_s$ is equal to 10 ms. One radio frame comprises ten subframes. The subframe length $T_{sf}$ is calculated by $df_{max}N_fT_s/1000$ and $df_{max}\ N_fT_s/1000$ is equal to 1 ms. The number of OFDM symbols per subframe $N^{subframe,u}_{symb}$ is calculated by $N^{slot}_{symb}N^{subframe,u}_{slot}$.

SCS of the OFDM-based waveform is calculated by subcarrier-spacing configuration u. For example, the SCS may be calculated by $15000*2^u$.

Figure 3:
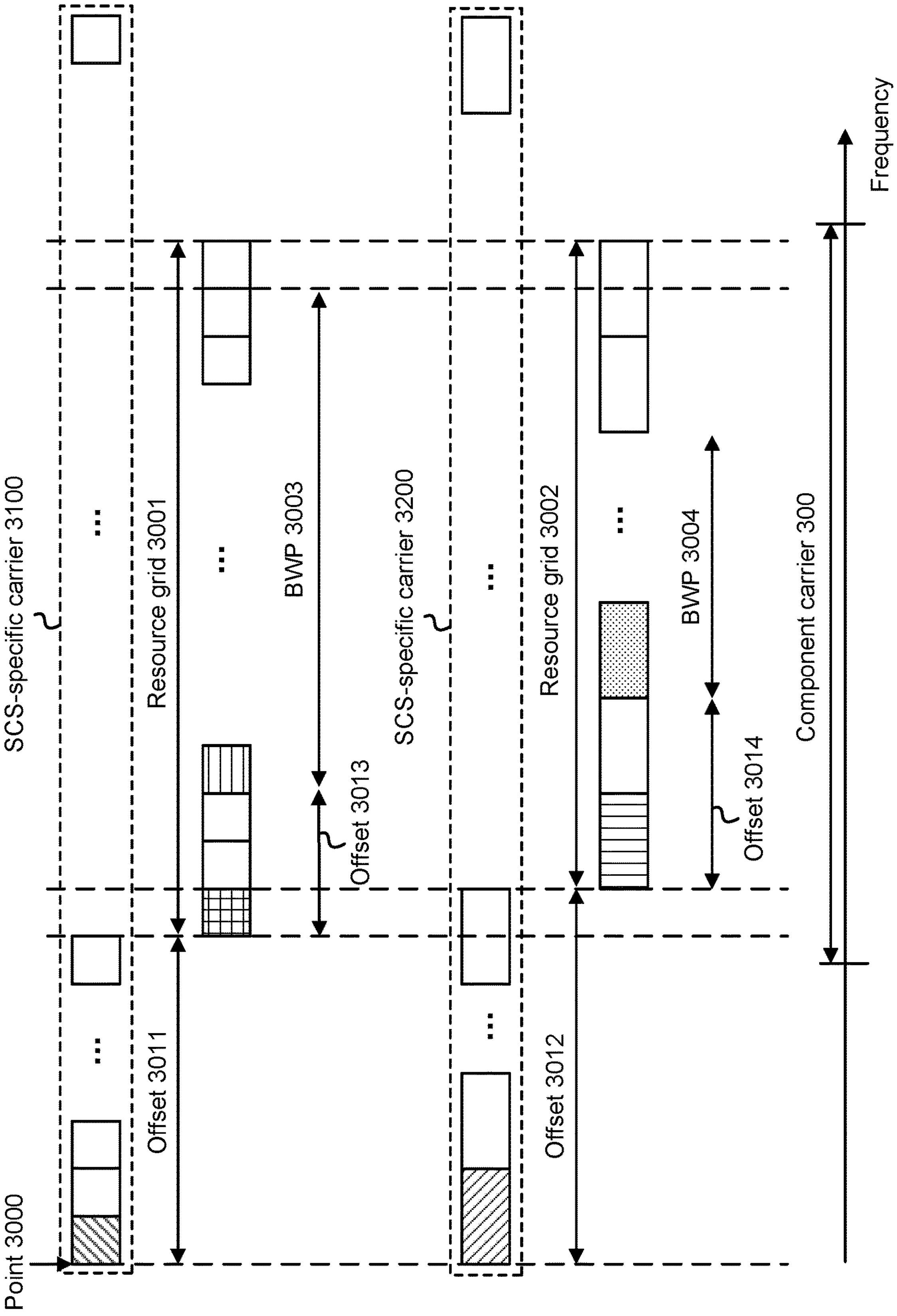
FIG. 3 is a block diagram illustrating an example of a method of configuring SCS-specific carriers according to an aspect of the present embodiment.

FIG. 3 is a diagram showing an example of a method of configuring SCS-specific carriers according to an aspect of the present embodiment. The horizontal axis in FIG. 3 represents the frequency domain. FIG. 3 shows a configuration example of two SCS-specific carriers associated with Component carrier 300. In FIG. 3, $u_1=u_2-1$ is assumed.

Point (Point) 3000 is an identifier for identifying a subcarrier. Point 3000 is also referred to as Point A. Common resource blocks (CRB: Common resource block) for SCS-specific carrier 3100 are defined with respect to Point 3000. The CRB with index 0 is represented by the block indicated by the upper right diagonal line. CRBs for SCS-specific carrier 3200 are defined with respect to Point 3000. The CRB with index 0 is represented by the block indicated by the upper left diagonal line.

The CRB with index 0 is defined as the CRB where a subcarrier in the CRB coincides with the subcarrier identified by Point A.

In FIG. 3, the bandwidth of one CRB in the SCS-specific carrier 3100 is a half bandwidth of one CRB in the SCS-specific carrier 3200. In a different example from FIG. 3, the bandwidth of one CRB in the SCS-specific carrier 3100 may be the same as the bandwidth of one CRB in the SCS-specific carrier 3200.

The offset 3011 is an RB-level (Resource Block-level) offset from the CRB with index 0 for SCS-specific carrier 3100 to the reference point of the resource grid 3001. The reference point of the resource grid 3001 is the block indicated by the grid line. The offset 3012 is an RB-level offset from the CRB with index 0 for SCS-specific carrier 3200 to the reference point of the resource grid 3002. The reference point of the resource grid 3002 is the block indicated by the vertical line.

The offset 3013 is an RB-level offset from the reference point of the resource grid 3001 to the reference point of the BWP (BandWidth Part) 3003. The reference point of the BWP 3003 is the block indicated by the horizontal line. The offset 3014 is an RB-level offset from the reference point of the resource grid 3001 to the reference point of the BWP 3004. The reference point of the BWP 3004 is the block indicated by dots.

Figure 4:
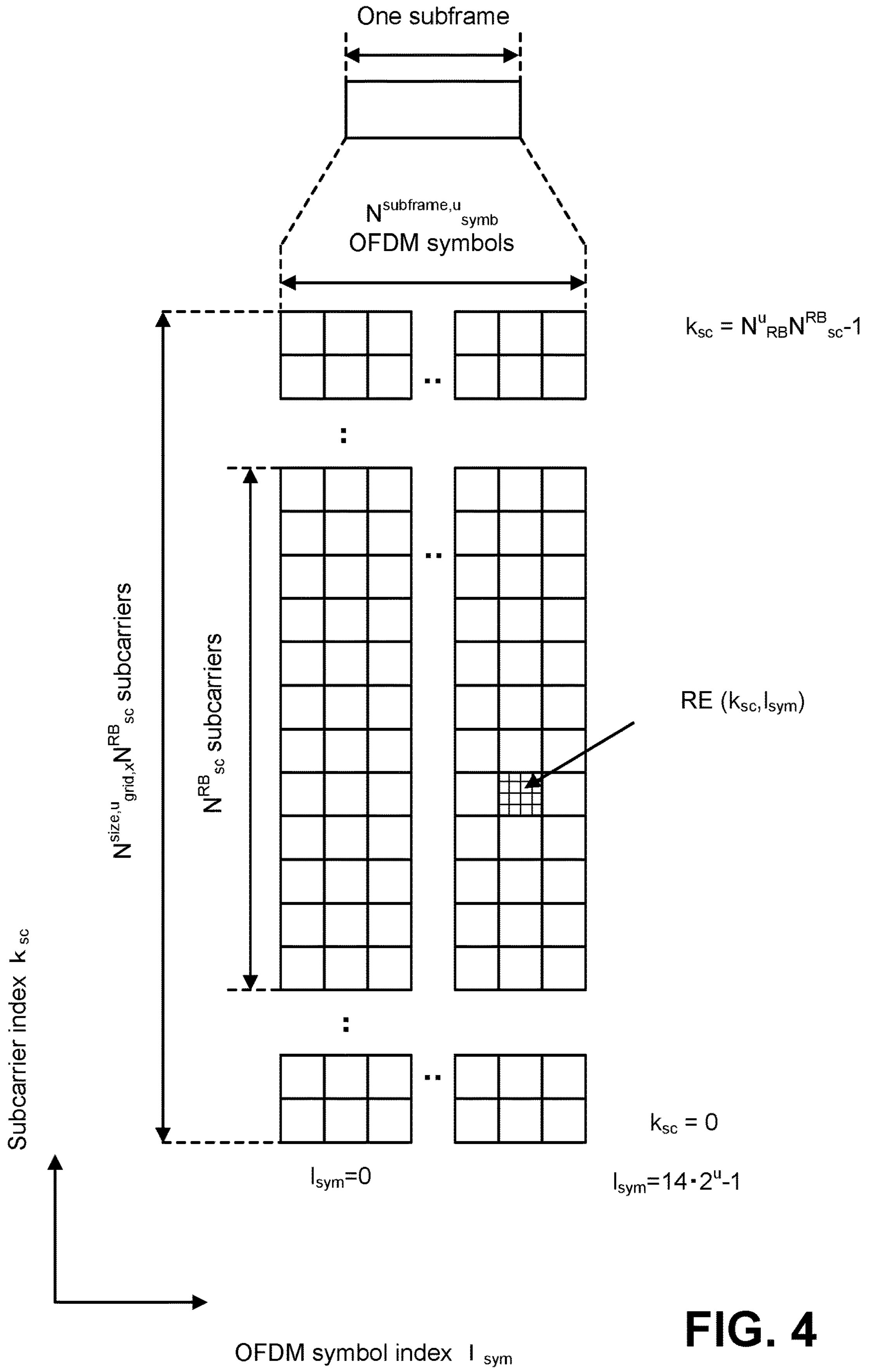
FIG. 4 is a block diagram illustrating an example of a method of configuring a resource grid according to an aspect of an example embodiment.

FIG. 4 is a diagram showing an example of a method of configuring a resource grid according to an aspect of an example embodiment and mode. The horizontal axis represents OFDM symbol index $l_{sym}$. The vertical axis represents the subcarrier index $k_{sc}$. The resource grid comprises $N^{size,\ u}_{grid1,}xN^{RB}_{sc}$ subcarriers and $N^{subframes,\ u}_{symb}$ OFDM symbols. A resource specified by the subcarrier index $k_{sc}$ and the OFDM symbol index $l_{sym}$ in a resource grid is also referred to as RE (Resource Element).

A resource block (RB: Resource Block) comprises $N^{RB}_{sc}$ consecutive subcarriers. A resource block is a generic name of CRB, PRB (Physical Resource Block), and VRB (Virtual Resource Block). In FIG. 4, $N^{RB}_{sc}$ is 12.

CRBs are indexed in ascending order starting at CRB with index 0. PRBs are indexed in ascending order starting at its reference point of the BWP.

A BWP is defined as a subset of resource blocks included in the resource grid. The BWP includes $N^{size,u}_{BWP,i}$ resource blocks starting from the reference points of the BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation is a framework of communication using a plurality of aggregated serving cells or using a plurality of component carriers.

Figure 5:
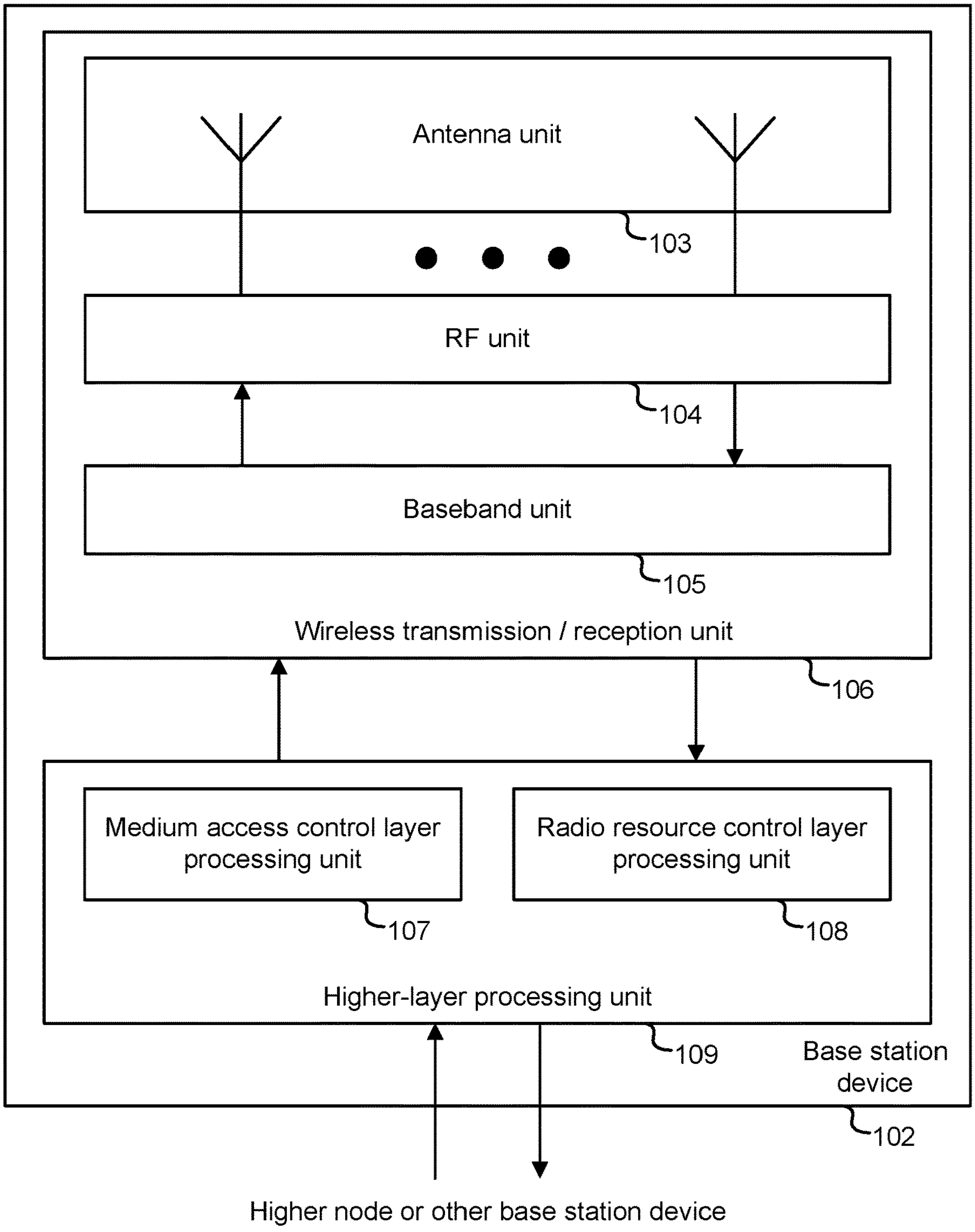
FIG. 5 is a block diagram illustrating a configuration example of a base station device according to an aspect of the present embodiment.

FIG. 5 is a schematic block diagram showing a configuration example of base station device 102 according to an aspect of the present embodiment. As shown in FIG. 5, base station device 102 comprises a part or all of wireless transmission/reception unit (or physical layer processing unit) 106 and higher-layer processing unit 109. Wireless transmission/reception unit 106 comprises a part or all of antenna unit 103, RF (Radio Frequency) unit 104, and baseband unit 105. Higher-layer processing unit 109 comprises a part or all of MAC (Medium Access Control) layer processing unit 107 and RRC (Radio Resource Control) layer processing unit 108.

Wireless transmission/reception unit 106 comprises a part of or all of wireless transmission unit and wireless reception unit. The configuration of baseband unit 105 in wireless transmission unit and the configuration of baseband unit 105 in wireless reception unit may be the same or different. The configuration of RF unit 104 in wireless transmission unit and the configuration of RF unit 104 in wireless reception unit may be the same or different. The configuration of the antenna unit 103 in the wireless transmission unit and the configuration of the antenna unit 103 in the wireless reception unit may be the same or different.

Higher-layer processing unit 109 provides downlink data (transport blocks) to wireless transmission/reception unit 106 (or wireless transmission unit). Higher-layer processing unit 109 performs processing of a part or all of the MAC layer, the PDCP (Packet Data Convergence Protocol) layer, the RLC (Radio Link Control) layer and the RRC layer.

The MAC layer processing unit 107 performs processing of the MAC layer. The RRC layer processing unit 108 performs processing of the RRC layer. RRC layer processing unit 108 manages various RRC parameters of Terminal device 101.

Wireless transmission/reception unit 106 (or wireless transmission unit) performs processing such as encoding and modulation. Wireless transmission/reception unit 106 (or wireless transmission unit) generates a physical signal by encoding and modulating the downlink data. Wireless transmission/reception unit 106 (or wireless transmission unit) converts OFDM symbols in the physical signal to a baseband signal by conversion to a time-continuous signal. Wireless transmission/reception unit 106 (or wireless transmission unit) transmits the baseband signal (or the physical signal) to terminal device 101 via radio frequency. Wireless transmission/reception unit 106 (or wireless transmission unit) may arrange the baseband signal (or the physical signal) on a component carrier and transmit the baseband signal (or the physical signal) to terminal device 101.

Wireless transmission/reception unit 106 (or wireless reception unit) performs processing such as demodulation and decoding. Wireless transmission/reception unit 106 (or wireless reception unit) separates, demodulates and decodes the received physical signal, and provides the decoded information to Higher-layer processing unit 109. Wireless transmission/reception unit 106 (or wireless reception unit) may perform the channel access procedure prior to the transmission of the physical signal.

RF unit 104 demodulates the radio signal received via antenna unit 103 into an analog signal, and/or removes extra frequency components. RF unit 104 provides the processed analog signal to baseband unit 105.

Baseband unit 105 converts the analog signal input from RF unit 104 into a baseband signal. Baseband unit 105 separates a portion which corresponds to CP from the baseband signal. Baseband unit 105 performs FFT (Fast Fourier Transformation) on the baseband signal from which the CP has been removed. Baseband unit 105 extracts components of the physical signal from the baseband signal. Baseband unit 105 performs IFFT (Inverse Fast Fourier Transformation) on the downlink data to generate time-continuous signal, adds a CP to the generated signal, generates a baseband signal, and converts the baseband signal into an analog signal. Baseband unit 105 provides the analog signal to RF unit 104.

RF unit 104 removes extra frequency components from the analog signal input from Baseband unit 105, up-converts the analog signal to a radio frequency, and transmits it via Antenna unit 103. RF unit 104 may have the function of controlling transmission power.

From terminal device 101's perspective, serving cells are cells which provide wireless communication service. Serving cells may be any of PCell (Primary cell), PSCell (Primary SCG cell), and SCell (Secondary Cell). PCell represents a serving cell in an MCG (Master Cell Group). A PCell is a serving cell which is used for an initial connection establishment procedure or a connection re-establishment procedure by Terminal device 101. PSCell represents a serving cell included in an SCG (Secondary Cell Group). A PSCell is a serving cell in which random-access is performed by terminal device 101. SCell represents a serving cell which is different from PCell and PSCell. Serving cell group represents a designation including at least MCG and SCG. The serving cell group comprises one or more serving cells.

Terminal device 101 configures one or more downlink BWPs per serving cell. Terminal device 101 configures one or more uplink BWPs per serving cell.

Terminal device 101 receives or tries to detect PDSCH (Physical Downlink Shared CHannel), PDCCH (Physical Downlink Control Channel), and CSI-RS (Channel State Information-Reference Signal) in the active downlink BWP. Terminal device 101 transmits PUCCH (Physical Uplink Control CHannel) and PUSCH (Physical Uplink Shared CHannel) in the active uplink BWP. The active downlink BWP and the active uplink BWP are also referred to as active BWP.

Terminal device 101 does not receive PDSCH, PDCCH, and CSI-RS in the downlink BWPs other than the active downlink BWP. Terminal device 101 does not transmit PUCCH and PUSCH in the uplink BWPs other than the active uplink BWP. BWPs other than the active BWP is referred to as inactive BWP.

Figure 6:
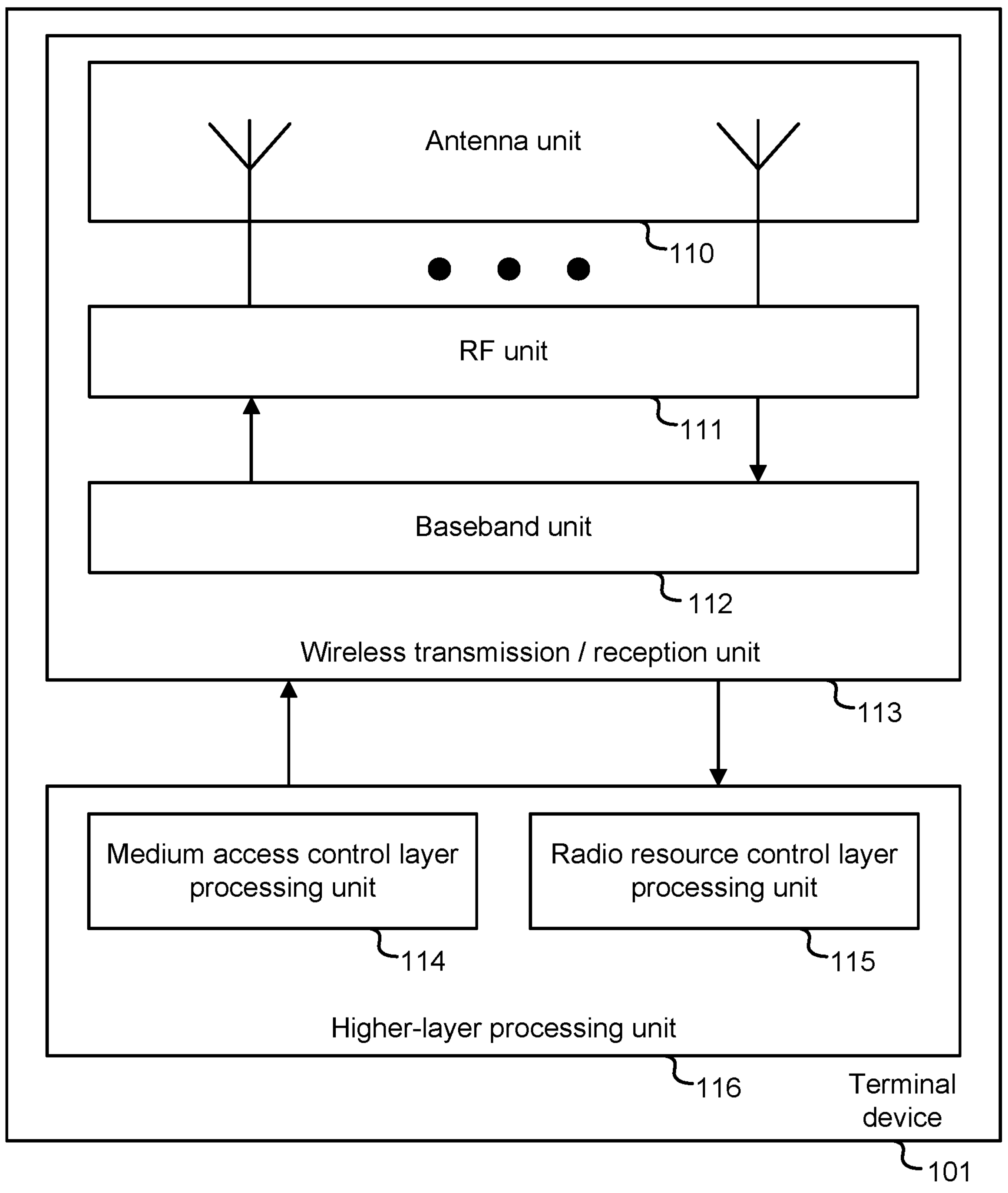
FIG. 6 is a block diagram illustrating a configuration example of the a terminal device according to an aspect of the present embodiment.

FIG. 6 is a schematic block diagram showing a configuration example of a terminal device 101 according to an aspect of the present embodiment. As shown in FIG. 6, terminal device 101 comprises a part or all of wireless transmission/reception unit (physical layer processing unit) 113 and higher-layer processing unit 116. Wireless transmission/reception unit 113 comprises a part or all of antenna unit 110, RF unit 111, and baseband unit 112. Higher-layer processing unit 116 comprises a part or all of MAC layer processing unit 114 and RRC layer processing unit 115.

The wireless transmission/reception unit 113 comprises a part of or all of a wireless transmission unit and a wireless reception unit. The configuration of baseband unit 112 in wireless transmission unit and the configuration of baseband unit 112 included in wireless reception unit may be the same or different. The configuration of RF unit 111 in wireless transmission unit and RF unit 111 in wireless reception unit may be the same or different. The configuration of antenna unit 110 in wireless transmission unit and the configuration of antenna unit 110 in Wireless reception unit may be the same or different.

Higher-layer processing unit 116 provides uplink data (transport blocks) to wireless transmission/reception unit 113 (or wireless transmission unit). Higher-layer processing unit 116 performs processing of the MAC layer, the PDCP layer, the RLC layer, and/or the RRC layer.

MAC layer processing unit 114 in higher-layer processing unit 116 performs processing of the MAC layer. RRC layer processing unit 115 in higher-layer processing unit 116 performs the process of the RRC layer. RRC layer processing unit 16 manages various RRC parameters of terminal device 101 based on RRC messages received from base station device 102.

Wireless transmission/reception unit 113 (or wireless transmission unit) performs processing such as encoding and modulation. Wireless transmission/reception unit 113 (or wireless transmission unit) generates a physical signal by encoding and modulating the uplink data. Wireless transmission/reception unit 113 (or wireless transmission unit) converts OFDM symbols in the physical signal to a baseband signal by conversion to a time-continuous signal. Wireless transmission/reception unit 113 (or wireless transmission unit) transmits the baseband signal (or the physical signal) to base station device 102 via radio frequency. Wireless transmission/reception unit 113 (or wireless transmission unit) may arrange the baseband signal (or the physical signal) on a BWP (active uplink BWP) and transmit the baseband signal (or the physical signal) to base station device 102.

Wireless transmission/reception unit 113 (or wireless reception unit) performs processing such as demodulation and decoding. Wireless transmission/reception unit 113 (or wireless reception unit) may receive a physical signal in a BWP (active downlink BWP) of a serving cell. Wireless transmission/reception unit 113 (or wireless reception unit) separates, demodulates and decodes the received physical signal, and provides the decoded information to higher-layer processing unit 116. Wireless transmission/reception unit 113 (or wireless reception unit) may perform the channel access procedure prior to the transmission of the physical signal.

RF unit 111 demodulates the radio signal received via Antenna unit 110 into an analog signal, and/or removes extra frequency components. RF unit 111 provides the processed analog signal to the baseband unit 112.

Baseband unit 112 converts the analog signal input from RF unit 111 into a baseband signal. The baseband unit 112 separates a portion which corresponds to CP from the baseband signal, performs FFT on the baseband signal from which the CP has been removed. Baseband unit 112 extracts components of the physical signal from the baseband signal.

Baseband unit 112 performs IFFT on the uplink data to generate time-continuous signal, adds a CP to the generated signal, generates a baseband signal, and converts the baseband signal into an analog signal. Baseband unit 112 provides the analog signal to RF unit 111.

RF unit 111 removes extra frequency components from the analog signal input from Baseband unit 112, up-converts the analog signal to a radio frequency, and transmits it via Antenna unit 110. RF unit 111 may have a function of controlling transmission power.

Hereinafter, physical signals (signals) will be described.

Physical signal is a generic term for physical downlink channels, physical downlink signals, physical uplink channels, and physical uplink signals. The physical channel is a generic term for physical downlink channels and physical uplink channels.

A physical uplink channel corresponds to a set of REs that carry one or both of information originating from the higher-layer and UCI (Uplink Control Information). In the wireless communication system according to one aspect of the present embodiment, a part or all of PUCCH, PUSCH, and PRACH (Physical Random Access CHannel) may be used.

A PUCCH may be used to transmit UCI. A PUCCH may be sent to deliver (transmit, convey) uplink control information. UCI may be mapped to the PUCCH. Terminal device 101 may transmit a PUCCH in which UCI is mapped. Base station device 102 may receive the PUCCH in which the UCI is mapped.

CSI (Channel State Information) is a kind of UCI. CSI is used to convey information related to the propagation path between the terminal device 101 and base station device 102.

HARQ-ACK (Hybrid Automatic Repeat request ACKnowledgement) information is a kind of UCI. HARQ-ACK information is used to convey whether downlink data has been successfully decoded or not.

SR (Scheduling Request) is a kind of UCI. SR is used to request uplink resource (PUSCH or UL-SCH).

A PUSCH may be used to transmit one or both of a transport block and UCI. A PUSCH may be sent to deliver (transmit, convey) one or both of a transport block and uplink control information. Terminal device 101 may transmit a PUSCH in which one or both of a transport block and UCI is mapped. Base station device 102 may receive the PUSCH in which the one or both of the transport block and the UCI is mapped.

A PRACH may be used to transmit a random-access preamble. A PRACH may be sent to deliver (transmit, convey) an index of a random-access preamble. Terminal device 101 may transmit a PRACH. Base station device 102 may receive the PRACH.

For a given PRACH opportunity, 64 random-access preambles are defined. The random-access preamble is specified (determined, given) based on the cyclic shift $C_v$ of the PRACH and the sequence index u for the PRACH.

A physical uplink signal corresponds to a set of REs. A physical uplink signal may not carry information generated in the higher-layer. Terminal device 101 may transmit a physical uplink signal. Base station device 102 may receive the physical uplink signal. In the radio communication system according to one aspect of the present embodiment, a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH may be given based on a set of antenna ports for the PUSCH. For example, a set of DMRS antenna ports for a PUSCH may be the same as a set of antenna ports for the PUSCH.

A PUSCH and a DMRS for the PUSCH is collectively referred to as PUSCH.

A set of antenna ports of a DMRS for a PUCCH may be given based on a set of antenna ports for the PUCCH. For example, a set of DMRS antenna ports for a PUCCH may be the same as a set of antenna ports for the PUCCH.

A PUCCH and a DMRS for the PUCCH is collectively referred to as PUCCH.

A physical downlink channel corresponds to a set of REs that carry one or both of information originating from the higher-layer and DCI (Downlink Control Information). In the wireless communication system according to one aspect of the present embodiment, a part or all of PBCH (Physical Broadcast Channel), PDCCH (Physical Downlink Control Channel), and PDSCH (Physical Downlink Shared Channel) may be used.

A PBCH may be used to transmit a MIB (Master Information Block). A PBCH may be sent to deliver (transmit, convey) a MIB. Terminal device 101 may receive a PBCH. Base station device 102 may transmit the PBCH.

A PDCCH may be used to transmit DCI. A PDCCH may be sent to deliver (transmit, convey) DCI. Terminal device 101 may receive a PDCCH in which DCI is mapped. Base station device 102 may transmit the PDCCH in which the DCI is mapped.

DCI format comprises a set of information fields. Each information field masks a bit sequence for the DCI. Bits masked by an information field is associated with a specific meaning associated with the information field.

Several DCI formats may be used in the wireless communication system according to one aspect of the present embodiment.

Several example DCI formats are provided.

DCI format 0_0 is used for scheduling a PUSCH for a cell. The DCI format 0_0 comprises a part or all of Information fields 1A to 1E. Information field 1A is a DCI format identification field. Information field 1B is a FDRA (Frequency Domain Resource Assignment) field. Information field 1C is a TDRA (Time Domain Resource Assignment) field. Information field 1D is a frequency-hopping flag field. Information field 1E is an MCS (Modulation-and-Coding-Scheme) field.

A DCI format identification field indicates whether a DCI format comprising the DCI format identification field is an uplink DCI format or a downlink DCI format. The DCI format identification field included in the DCI format 0_0 indicates that the DCI format 0_0 is an uplink DCI format.

A FDRA field in a DCI format is used to indicate assignment of frequency resources for a physical channel scheduled by the DCI format.

A TDRA field in a DCI format is used to indicate assignment of time resources for a physical channel scheduled by the DCI format.

A frequency-hopping flag field in a DCI format is used to indicate whether frequency-hopping is applied to a physical channel scheduled by the DCI format.

A MCS field in a DCI format is used to indicate one or both of a modulation scheme for a physical channel scheduled by the DCI format and a target code rate for the physical channel. The target code rate is used to determine a TBS (Transport Block Size) for the physical channel.

The DCI format 0_0 may not comprise fields used for a CSI request. That is, CSI may not be requested by the DCI format 0_0.

The DCI format 0_0 may not comprise a carrier indicator field. If an uplink DCI format does not comprise a carrier indicator field, Terminal device 101 determines that an uplink component carrier on which a PUSCH scheduled by the uplink DCI format is mapped is an uplink component carrier in a serving cell which comprises a downlink component carrier on which a PDCCH with the uplink DCI format is mapped.

The DCI format 0_0 may not comprise a BWP indicator field. If a DCI format does not comprise a BWP indicator field, Terminal device 101 determines that active BWP change has not been triggered by the DCI format.

DCI format 0_1 is used for scheduling of a PUSCH for a cell. The DCI format 0_1 comprises a part or all of Information fields 2A to 2H. Information field 2A is a DCI format identification field. Information field 2B is a FDRA field. Information field 2C is a TDRA field. Information field 2D is a frequency-hopping flag field. Information field 2E is an MCS field. Information field 2F is a CSI request field. Information field 2G is a BWP field. Information field 2H is a carrier indicator field.

The DCI format identification field in the DCI format 0_1 indicates that the DCI format 0_1 is an uplink DCI format.

The CSI request field is used to request CSI reporting.

If the DCI format 0_1 comprises a BWP field, the BWP field is used to indicate an uplink BWP on which a PUSCH scheduled by the DCI format 0_1 is mapped.

If the DCI format 0_1 comprises the carrier indicator field, the carrier indicator field is used to indicate an uplink component carrier on which a PUSCH is mapped.

DCI format 1_0 is used for scheduling of a PDSCH for a cell. The DCI format 1_0 comprises a part or all of Information fields 3A to 3F. Information field 3A is a DCI format identification field. Information field 3B is a FDRA field. Information field 3C is a TDRA field. Information field 3D is an MCS field. Information field 3E is a PDSCH-to-HARQ-feedback indicator field. Information field 3F is a PUCCH resource indicator field.

The DCI format identification field in the DCI format 1_0 indicates that the DCI format 1_0 is a downlink DCI format.

The PDSCH-to-HARQ-feedback timing indicator field is used to indicate the offset (K1) from a slot in which the last OFDM symbol of a PDSCH scheduled by the DCI format is included to another slot in which the first OFDM symbol of a PUCCH triggered by the DCI format 1_0 is mapped.

The PUCCH resource indicator field is used to indicate a PUCCH resource.

The DCI format 1_0 may not comprise the carrier indicator field. If a downlink DCI format does not comprise the carrier indicator field, Terminal device 101 determines that a downlink component carrier on which a PDSCH scheduled by the downlink DCI format is mapped is the downlink component carrier on which the PDCCH with the DCI format 1_0 is mapped.

The DCI format 1_0 may not include the BWP field.

The DCI format 1_1 is used for scheduling of a PDSCH for a cell. The DCI format 1_1 comprises a part or all of Information fields 4A to 4H. Information field 4A is a DCI format identification field. Information field 4B is a FDRA field. The 4C is a TDRA field. Information field 4D is an MCS field. Information field 4E is a PDSCH-to-HARQ-feedback indicator field. Information field 4F is a PUCCH resource indicator field. Information field 4G is a BWP field. Information field 4H is a carrier indicator field.

The DCI format identification field in the DCI format 1_1 indicates that the DCI format 1_1 is a downlink DCI format.

A PDSCH may be used to transmit a transport block. A PDSCH may be sent to deliver (transmit, convey) a transport block. Base station device 102 may transmit a PDSCH. Terminal device 101 may receive the PDSCH.

A physical downlink signal corresponds to a set of REs. A physical downlink signal may not carry the information generated in the higher-layer. Base station 102 transmits a physical downlink signal. Terminal device 101 receives the physical downlink signal. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

A synchronization signal is used to synchronize in the frequency domain and time domain for downlink. The synchronization signal is a generic name of PSS (Primary Synchronization Signal) and SSS (Secondary Synchronization Signal).

Figure 7:
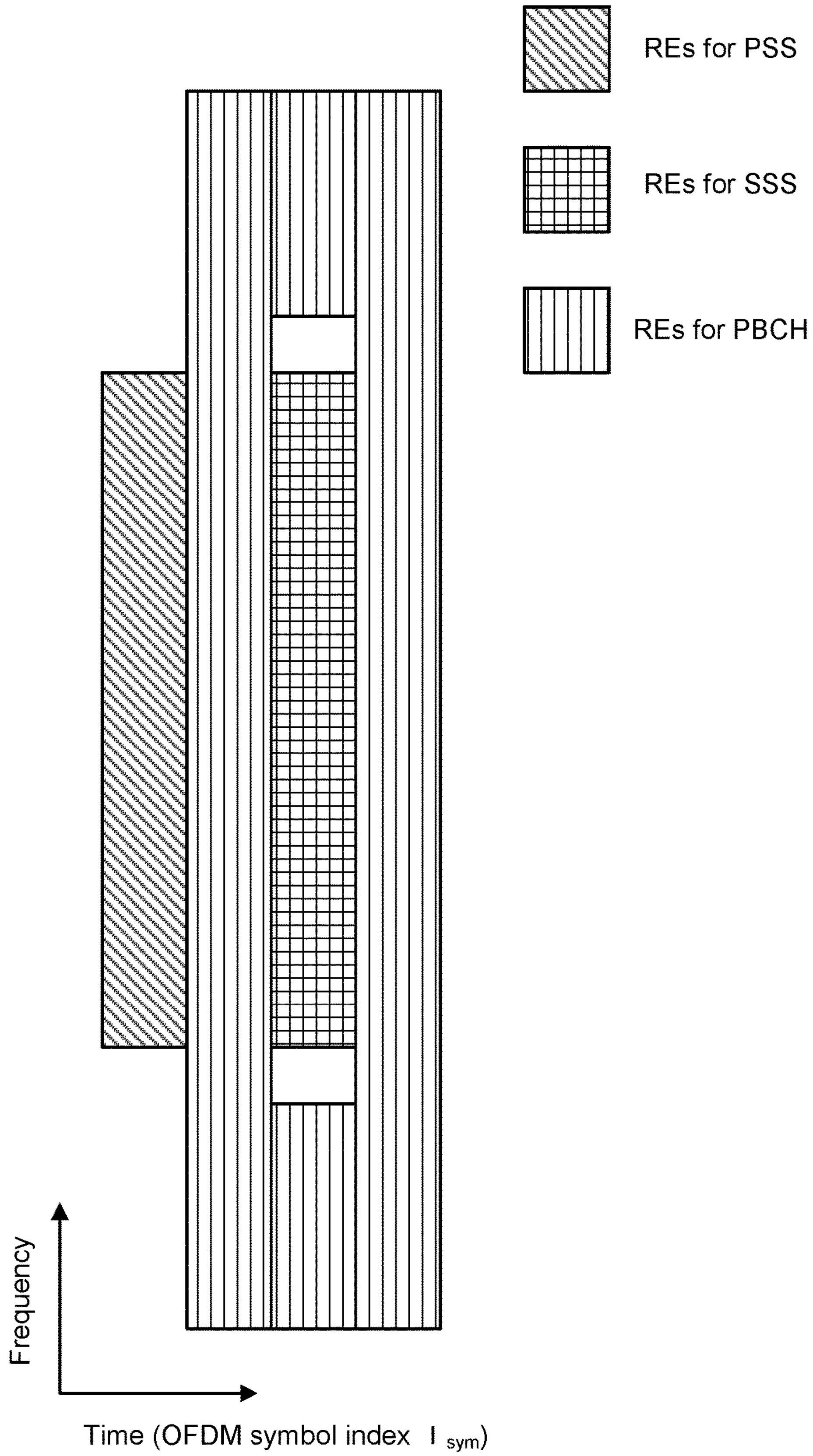
FIG. 7 is a block diagram illustrating a configuration example of an SS/PBCH block comprising a PSS and an SSS according to an aspect of the present embodiment.

FIG. 7 is a diagram showing a configuration example of an SS/PBCH block comprising a PSS and a SSS according to an aspect of the present embodiment. In FIG. 7, the horizontal axis represents the OFDM symbol index $l_{sym}$, and the vertical axis represents the frequency domain. The shaded blocks represents a set of REs for the PSS. The block of grid lines represents a set of REs for the SSS. Also, the blocks in the horizontal line represent a set of REs for the PBCH and a set of REs for a DMRS for the PBCH.

The SS/PBCH block in FIG. 7 comprises a PSS, an SSS, and a PBCH. The SS/PBCH block comprises 4 consecutive OFDM symbols and 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of the PSS, the SSS, the PBCH, and the DMRS for the PBCH in an SS/PBCH block may be identical.

DL DMRS is a generic name of a DMRS for a PBCH, a DMRS for a PDSCH and a DMRS for a PDCCH.

A set of antenna ports of a DMRS for a PDSCH may be given based on a set of antenna ports for the PDSCH. For example, a set of DMRS antenna ports for a PDSCH may be the same as a set of antenna ports for the PDSCH.

A PDSCH and a DMRS for the PDSCH is collectively referred to as PDSCH.

A set of antenna ports of a DMRS for a PDCCH may be given based on a set of antenna ports for the PDCCH. For example, a set of DMRS antenna ports for a PDCCH may be the same as a set of antenna ports for the PDCCH.

A PDCCH and a DMRS for the PDCCH is collectively referred to as PDCCH.

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channels used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in a plurality of terminal devices. The DCCH may be used to transmit a dedicated RRC message to a terminal device.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter in an RRC message or a MAC message. A MAC message may comprise of one or more MAC CEs (Control Element). A higher-layer parameter may be a cell-specific parameter or a UE-specific parameter. A cell-specific parameter is a parameter including a common configuration in a cell. A UE-specific parameter is a parameter including a configuration that may be configured differently for each UE.

Base station device 102 may indicate change of cell-specific parameters by reconfiguration with random-access. Base station device 102 may indicate change of UE-specific parameters by reconfiguration with or without random-access.

Figure 8:
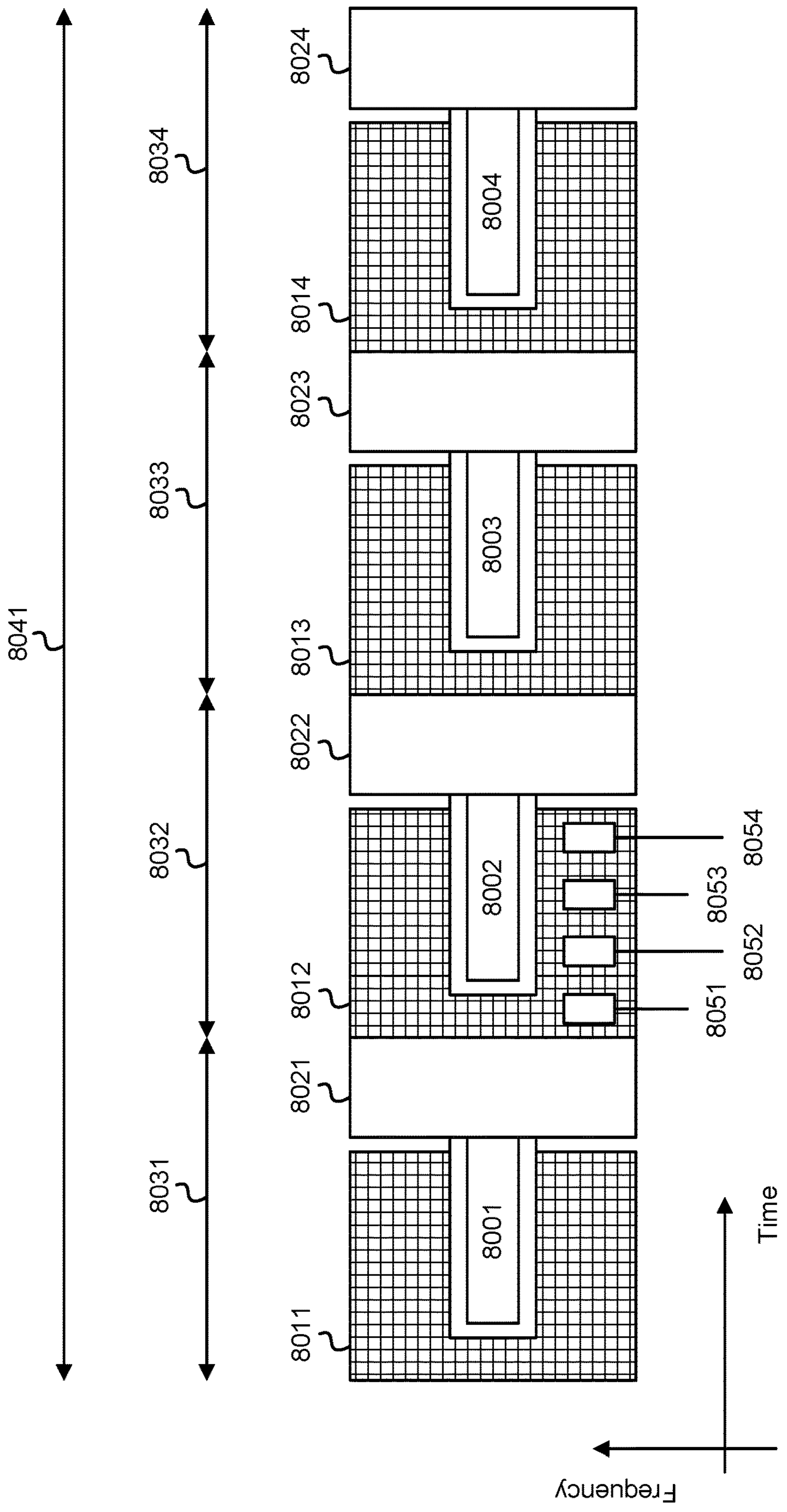
FIG. 8 is a block diagram illustrating resource partitioning in a serving cell according to an aspect of the present embodiment.

FIG. 8 is an example resource partitioning in a serving cell according to an aspect of the present embodiment. The horizontal axis represents the time domain. The vertical axis represents the frequency domain. Regions 8001, 8002, 8003, and 8004 represent the time-frequency resources for a UL subband. Regions 8011, 8012, 8013, and 8014 with grid lines represent DL regions. Regions 8021, 8022, 8023, and 8024 represent UL regions. Lines 8031, 8032, 8033, and 8034 represent periods of the time division duplex (TDD) pattern. Line 8041 represents a period of SS/PBCH blocks. Regions 8051, 8052, 8053, and 8054 represents resources for SS/PBCH blocks. Each Region represents resource for each SS/PBCH block with different index. Time domain guard periods are placed on a switching location from DL to UL. Frequency domain guard bands are placed on a boundary of DL and UL.

TDD pattern is a pattern comprised of a part of all of DL region, flexible region, and UL region. In FIG. 8, the TDD pattern comprises the DL region and the UL region. The time domain guard period between the DL region and UL region may be as part of the DL region, as part of the UL region, or flexible region. The TDD pattern is configured based on one or more RRC parameters provided by the RRC layer.

The UL subband is configured in one or both of the DL region and the time domain guard period. The time domain resource of the UL subband is configured by one or more RRC parameters provided by the RRC layer.

For example, the time domain resource of the UL subband may be configured by a one or more first RRC parameters used to indicate a periodicity of the UL subband, one or more second RRC parameters used to indicate the starting slot of the UL subband in each period, and one or more third RRC parameters used to indicate the length of the UL subband in each period in number of slots. For example, in a case that the periodicity is 20 slots, the starting slot is the 3rd slot, and the length is 11 slots, terminal device 101 determines that the UL subband with length of 11 slots starting at the 3rd slot is placed in each periodicity.

For example, the one or more first RRC parameters used to indicate the periodicity may be one or more RRC parameters different from the one or more RRC parameters used to indicate the periodicity of the TDD pattern. For example, the one or more RRC parameters used to indicate the periodicity of the TDD pattern may be reused to indicate the periodicity of the UL subband. For example, Terminal device 101 may assume the periodicity of the UL subband is the same as the periodicity of the TDD pattern.

For example, one or more fourth RRC parameters may be used to indicate the starting OFDM symbol of the UL subband in the starting slot. For example, one or more fifth RRC parameters may be used to indicate the length of the UL subband in number of symbols.

For example, the frequency domain resource of the UL subband may be configured by one or more first RRC parameters used to indicate the starting RB of the UL subband and one or more second RRC parameters used to indicate the length of the UL subband in number of RBs.

For example, the UL subband may be configured in a SCS-specific carrier. Therefore, in this case, the RRC parameters used to indicate resources of the UL subband may be provided per SCS-specific carrier. For example, the UL subband may be configured in a BWP. Therefore, in this case, the RRC parameters used to indicate resources of the UL subband may be provided per BWP.

Using the UL subband, Base station device 102 may perform simultaneous transmission and reception at a time. For example, in a time occasion with UL subband 8001, Base station device 102 performs transmission of physical downlink channels in region 8011 and reception of physical uplink channels in region 8001 at a time. The time occasion where the UL subband is mapped is referred to as SBFD (SubBand Full Duplex) region.

Various physical layer configuration may be independently provided for SBFD region and non-SBFD region. For example, base station device 102 may use different QCL property for the SBFD region and the non-SBFD region. For example, base station device 102 may use different settings for components of RF unit 104. For example, the components may include analog filters, amplifiers, or clocks. Therefore, frequent switching of SBFD region and non-SBFD region may be avoided.

Terminal device 101 may operate with half duplex. Therefore, in a case that a physical uplink channel to be transmitted overlaps with SS/PBCH blocks, terminal device 101 may drop transmission of the physical uplink channel.

Figure 9:
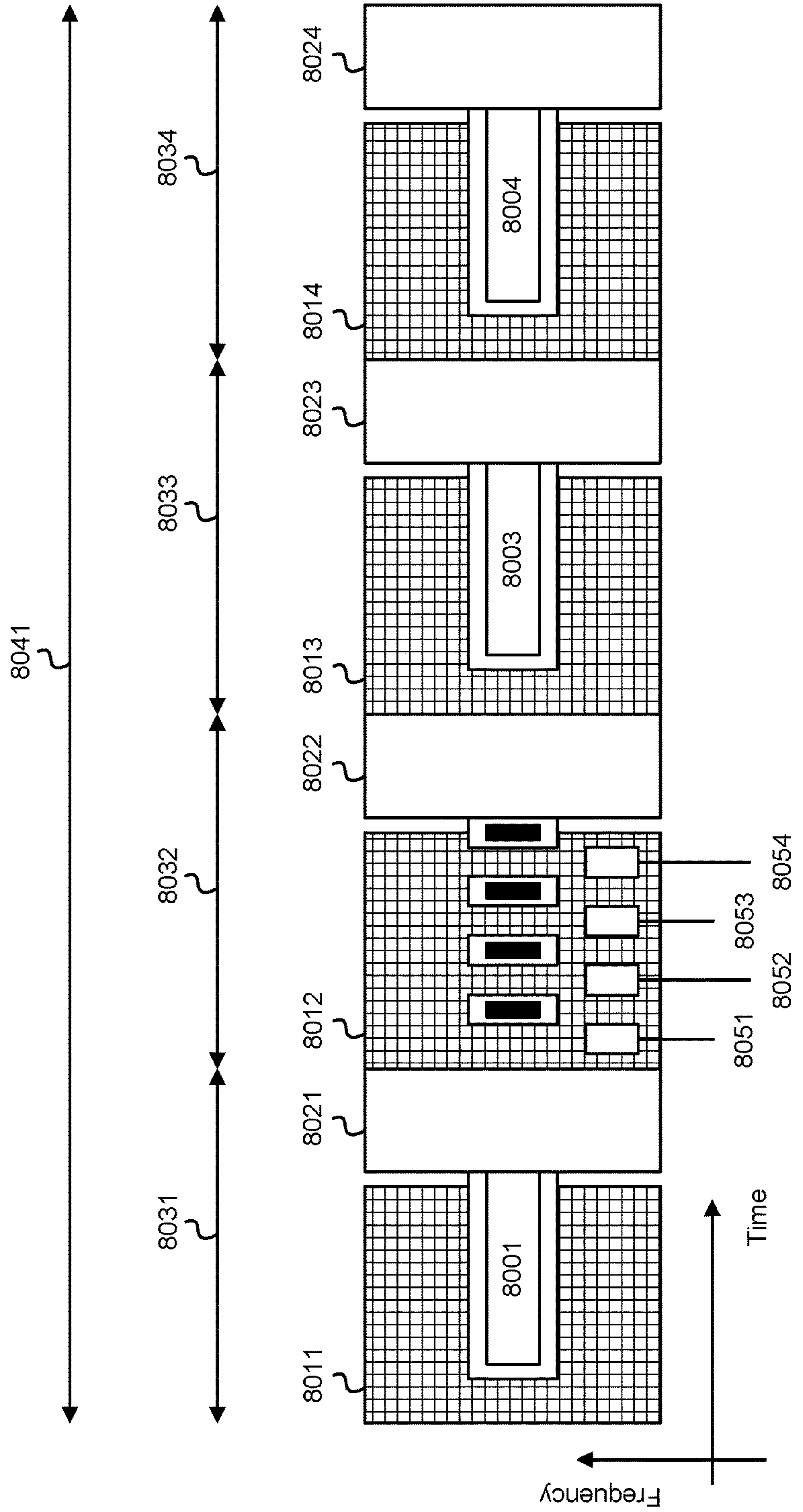
FIG. 9 is a block diagram illustrating an example resource partitioning in a serving cell according to an aspect of the present embodiment.

FIG. 9 is an example resource partitioning in a serving cell according to an aspect of the present embodiment. In FIG. 9, UL subband 8002 is partitioned into 4 regions with the black boxes. This is to avoid overlapping with the SS/PBCH blocks and the UL subband. However, the partitioning of the UL subband as in FIG. 9 increases the number of switching points of the SBFD region and the non-SBFD region.

Option 1: For example, a part of the UL subband configured by the RRC parameters may be disabled based on the time occasion of the SS/PBCH blocks. For example, the length of the part of the UL subband to be disabled may be larger than the length of the time occasion of the SS/PBCH blocks.

Figure 10:
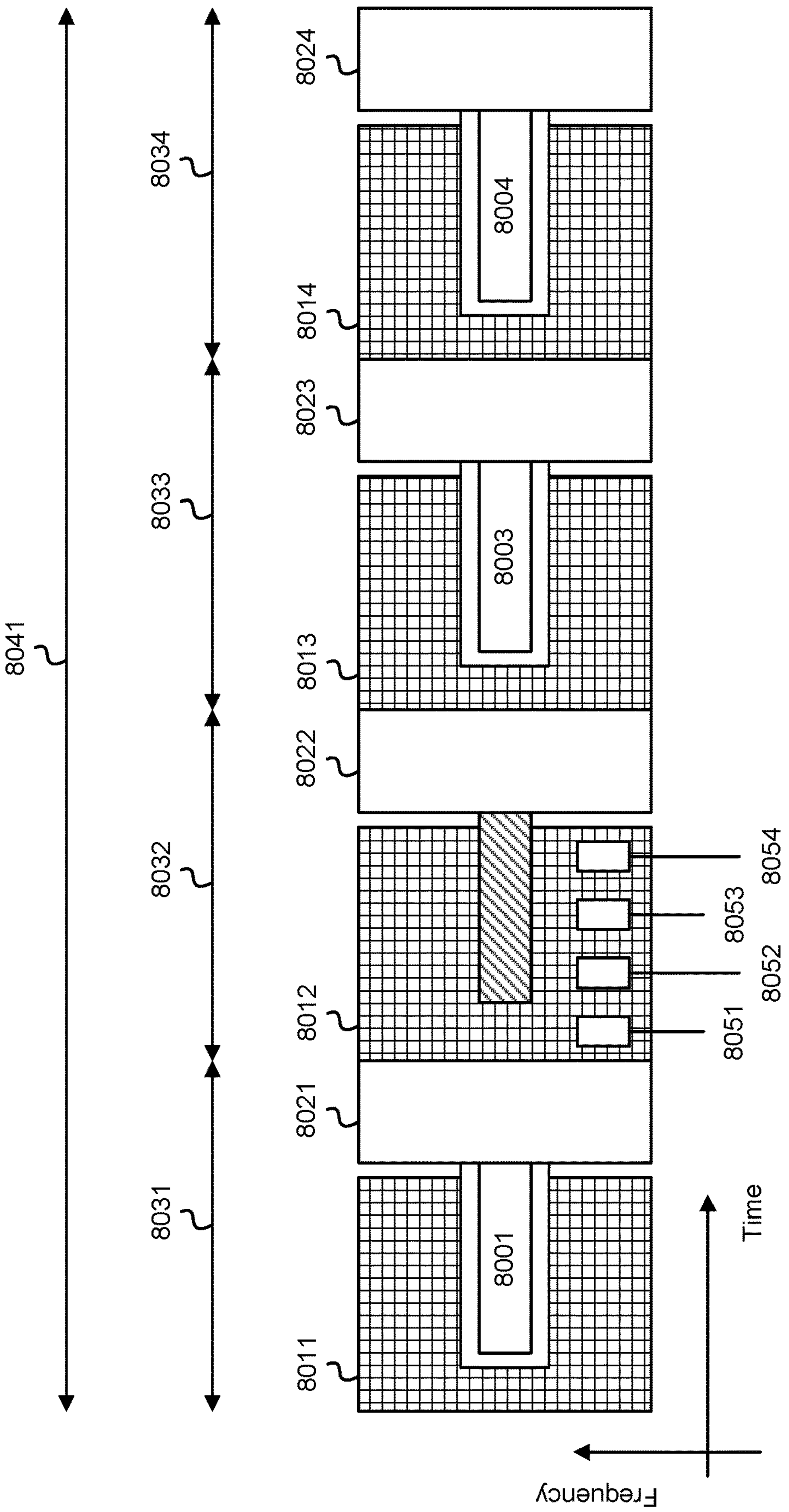
FIG. 10 is a block diagram illustrating an example resource partitioning in a serving cell according to an aspect of the present embodiment.

FIG. 10 is an example resource partitioning in a serving cell according to an aspect of the present embodiment. In FIG. 10, terminal device 101 assumes that UL subband 8002 is disabled.

Option 1A: For example, terminal device 101 may assume that a UL subband in a period of the UL subband as disabled as indicated by the region with upper right diagonal lines if at least one SS/PBCH block overlaps in the period. For example, terminal device 101 may assume that a UL subband in a period of the TDD pattern as disabled if at least one SS/PBCH block overlaps in the period.

Figure 11:
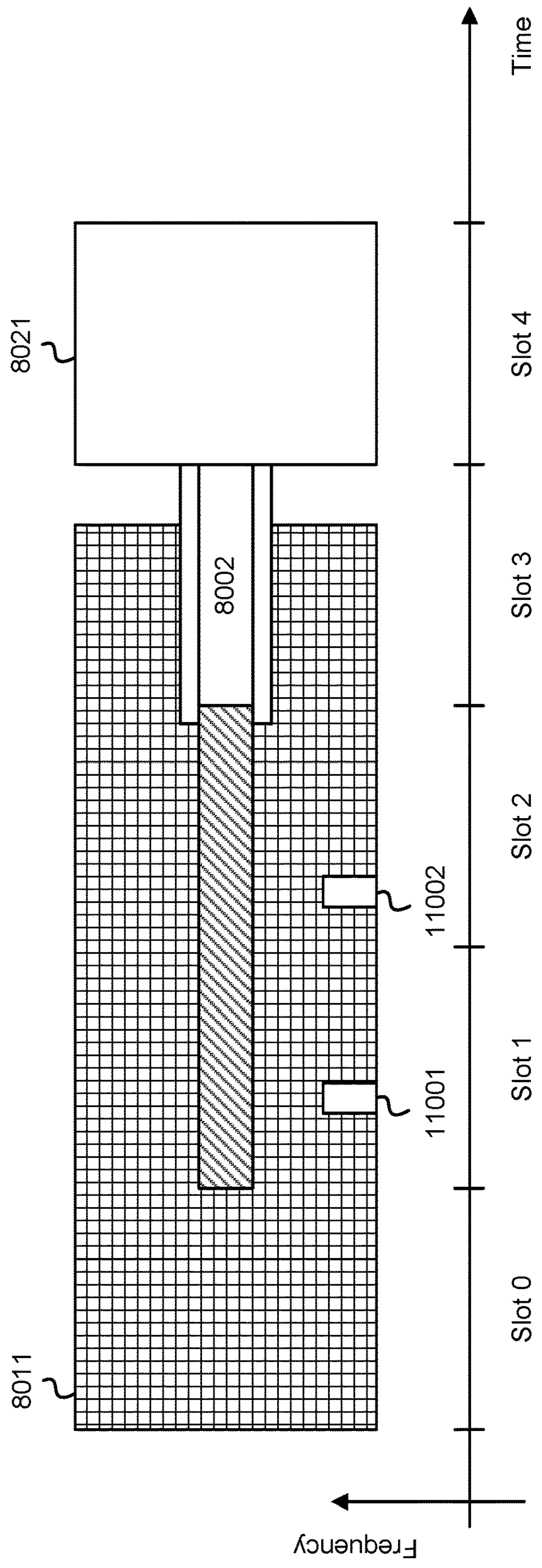
FIG. 11 is a block diagram illustrating an example resource partitioning in a serving cell in a case that the length of the TDD pattern period is 5 slots according to an aspect of the present embodiment.

FIG. 11 is an example resource partitioning in a serving cell in a case that the length of the TDD pattern period is 5 slots according to an aspect of the present embodiment. DL region 8011 is mapped in the slot with index 0 (Slot 0), the slot with index 1 (Slot 1), the slot with index 2 (Slot 2), and the slot with index 3 (Slot 3). UL region 8021 is mapped to the slot with index 4 (Slot 4). UL subband 8002 is configured in Slot 1, Slot 2, and Slot 3. An SS/PBCH block is mapped in Region 11001 in Slot 1, and another SS/PBCH block is mapped in Region 11002 in Slot 2.

Option 1B: For example, Terminal device 101 may assume that a UL subband in a slot is disabled if at least one SS/PBCH block is mapped in the slot.

Figure 12:
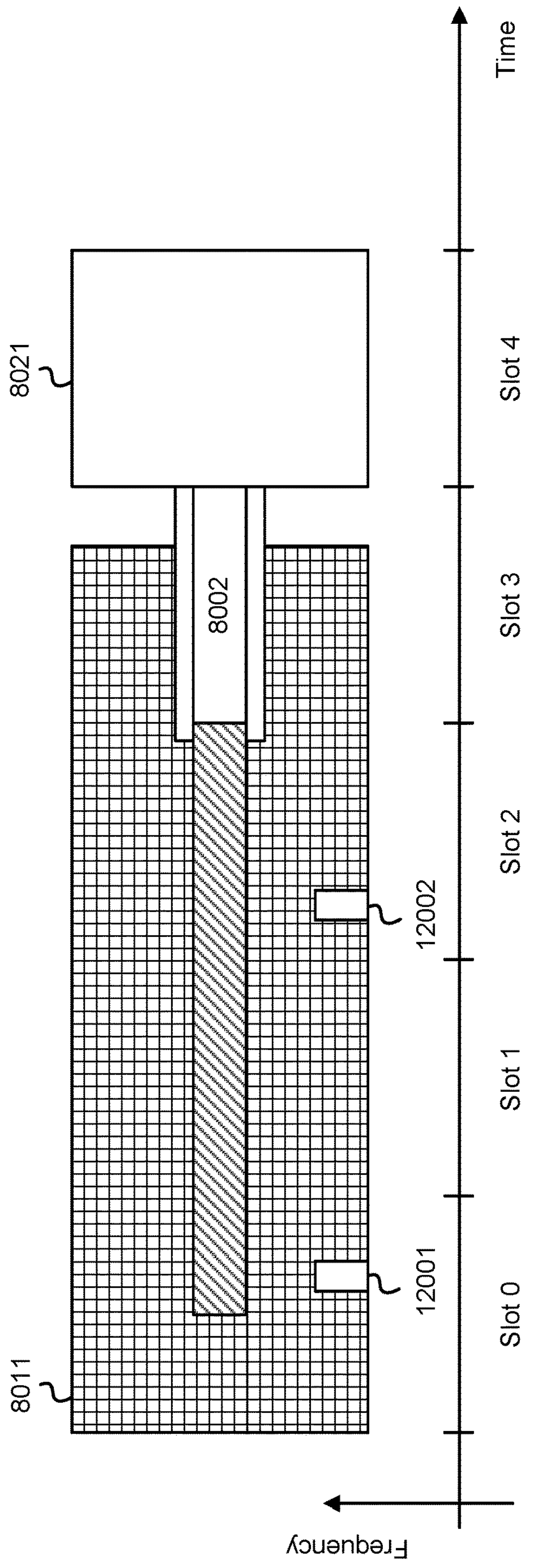
FIG. 12 is a block diagram illustrating an example resource partitioning in a serving cell in a case that the length of the TDD pattern period is 5 slots according to an aspect of the present embodiment.

FIG. 12 is an example resource partitioning in a serving cell in a case that the length of the TDD pattern period is 5 slots according to an aspect of the present embodiment. An SS/PBCH block is mapped in region 12001 in Slot 0, and another SS/PBCH block is mapped in region 12002 in Slot 2.

Option 1C: For example, terminal device 101 may assume that a UL subband in a time duration is disabled. Terminal device 101 may further determine that the duration starts at the first slot in which the first SS/PBCH block is mapped and ends at the last slot in which the last SS/PBCH block is mapped in the period of the UL subband. For example, in FIG. 12, the first slot is Slot 0 and the last slot is Slot 2.

Figure 13:
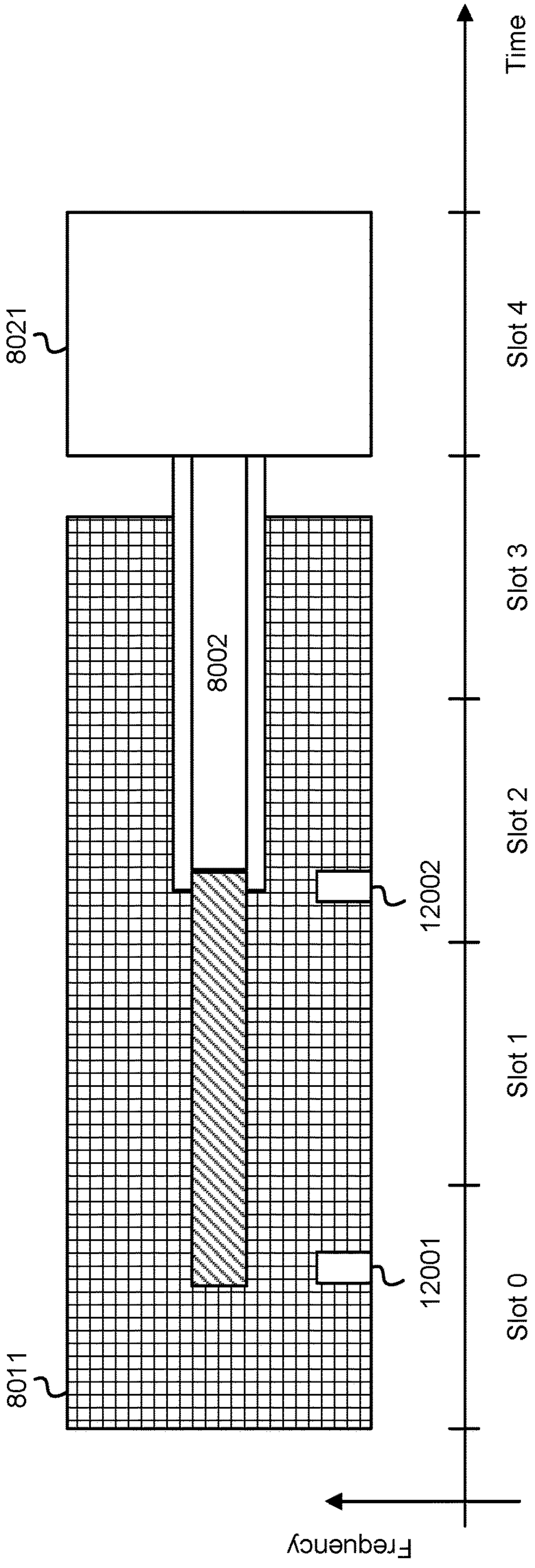
FIG. 13 is a block diagram illustrating an example resource partitioning in a serving cell in a case that the length of the TDD pattern period is 5 slots according to an aspect of the present embodiment.

FIG. 13 is an example resource partitioning in a serving cell in a case that the length of the TDD pattern period is 5 slots according to an aspect of the present embodiment. Terminal device assumes UL subband 8002 is disabled in a duration starting at the start of region 12001 and ending at the end of region 12002.

Option 1D: For example, terminal device 101 may assume that a UL subband in a time duration is disabled. Terminal device 101 may further determine that the duration starts at the first OFDM symbol in which the first SS/PBCH block is mapped and ends at the last OFDM symbol in which the last SS/PBCH block is mapped in the period of the UL subband.

Figure 14:
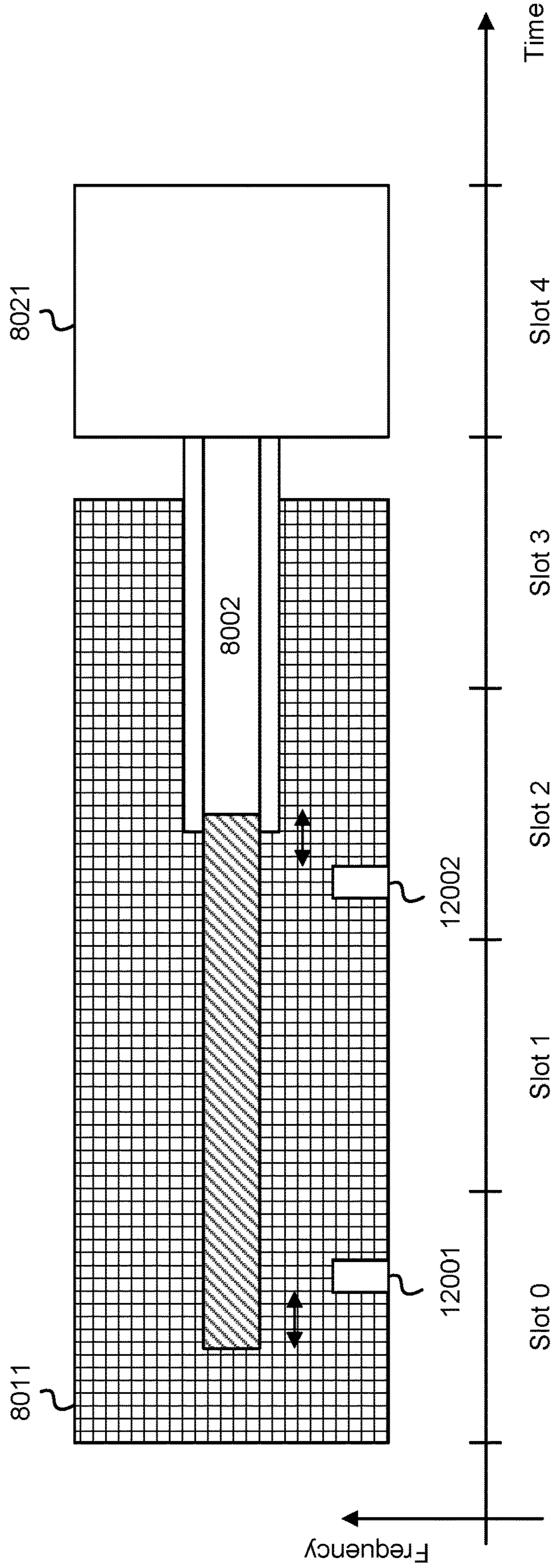
FIG. 14 is a block diagram illustrating an example resource partitioning in a serving cell in a case that the length of the TDD pattern period is 5 slots according to an aspect of the present embodiment.

FIG. 14 is an example resource partitioning in a serving cell in a case that the length of the TDD pattern period is 5 slots according to an aspect of the present embodiment. Terminal device assumes UL subband 8002 is disabled in a duration starting at X OFDM symbols earlier than the start of region 12001 and ending at Y OFDM symbols later than the end of Region 12002.

Option 1E: For example, Terminal device 101 may assume that a UL subband in a time duration is disabled. Terminal device 101 may further determine that the duration starts at X OFDM symbols earlier than the first OFDM symbol in which the first SS/PBCH block is mapped and ends at Y OFDM symbols later than the last OFDM symbol in which the last SS/PBCH block is mapped in the period of the UL subband.

In some examples, X and Y may be a predetermined value. For example, X may be indicated by one or more RRC parameters. For example, Y may be indicated by one or more RRC parameters.

In other examples, base station device 102 may indicate which options of Option 1A to 1E should be used in the serving cell via one or more RRC parameters.

Option 2: For example, transmission of a physical uplink channel may be dropped (omitted, cancelled) based on the time occasion of the SS/PBCH block. For example, if a physical uplink channel is placed in a duration larger than the time occasion of the SS/PBCH blocks, terminal device 101 drops transmission of the physical uplink channel.

For example, dropping of transmission of a physical uplink channel may be achieved by not mapping a transmission occasion in the slot.

Option 2A: For example, terminal device 101 may determine the duration as the period of the UL subband if at least one SS/PBCH block is placed in the duration.

Option 2B: For example, terminal device 101 may determine the duration as the duration of the slot in which at least one SS/PBCH block is mapped.

Option 2C: For example, terminal device 101 may determine that the duration starts at the first slot in which the first SS/PBCH block is mapped and ends at the last slot in which the last SS/PBCH block is mapped in the period of the UL subband.

Option 2D: For example, terminal device 101 may determine that the duration starts at the first OFDM symbol in which the first SS/PBCH block is mapped and ends at the last OFDM symbol in which the last SS/PBCH block is mapped in the period of the UL subband.

Option 2E: For example, terminal device 101 may determine that the duration starts at X OFDM symbols earlier than the first OFDM symbol in which the first SS/PBCH block is mapped and ends at Y OFDM symbols later than the last OFDM symbol in which the last SS/PBCH block is mapped in the period of the UL subband.

In some examples, X and Y may be a predetermined value. For example, X may be indicated by one or more RRC parameters. For example, Y may be indicated by one or more RRC parameters.

In other examples, base station device 102 may indicate which options of Option 2A to 2E should be used in the serving cell via one or more RRC parameters.

For example, Base station device 102 may indicate which options of Option 1A to 1E and Option 2A to 2E should be used in the serving cell via one or more RRC parameters.

The various foregoing example embodiments and modes may be utilized in conjunction with one another, e.g., in combination with one another.

Furthermore, base station device 102 according to the above-described embodiment may be achieved as an aggregation (an device group) including multiple devices. Each of the devices configuring such a device group may include some or all of the functions or the functional blocks of Base station device 102 according to the above-described embodiment. The device group may include each general function or each functional block of base station device 102. Furthermore, terminal device 101 according to the above-described embodiment can also communicate with the base station device as the aggregation.

Furthermore, base station device 102 according to the above-described embodiment may serve as an Evolved Universal Terrestrial Radio Access Network (E-UTRAN) and/or NG-RAN (Next Gen RAN, NR-RAN). Furthermore, base station device 102 according to the above-described embodiment may have some or all of the functions of a node higher than an eNodeB or the gNB.

Furthermore, some or all portions of each of terminal device 101 and base station device 102 according to the above-described embodiment may be typically achieved as an LSI which is an integrated circuit or may be achieved as a chip set. The functional blocks of each of terminal device 101 and base station device 102 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, terminal device 101 has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

Figure 15:
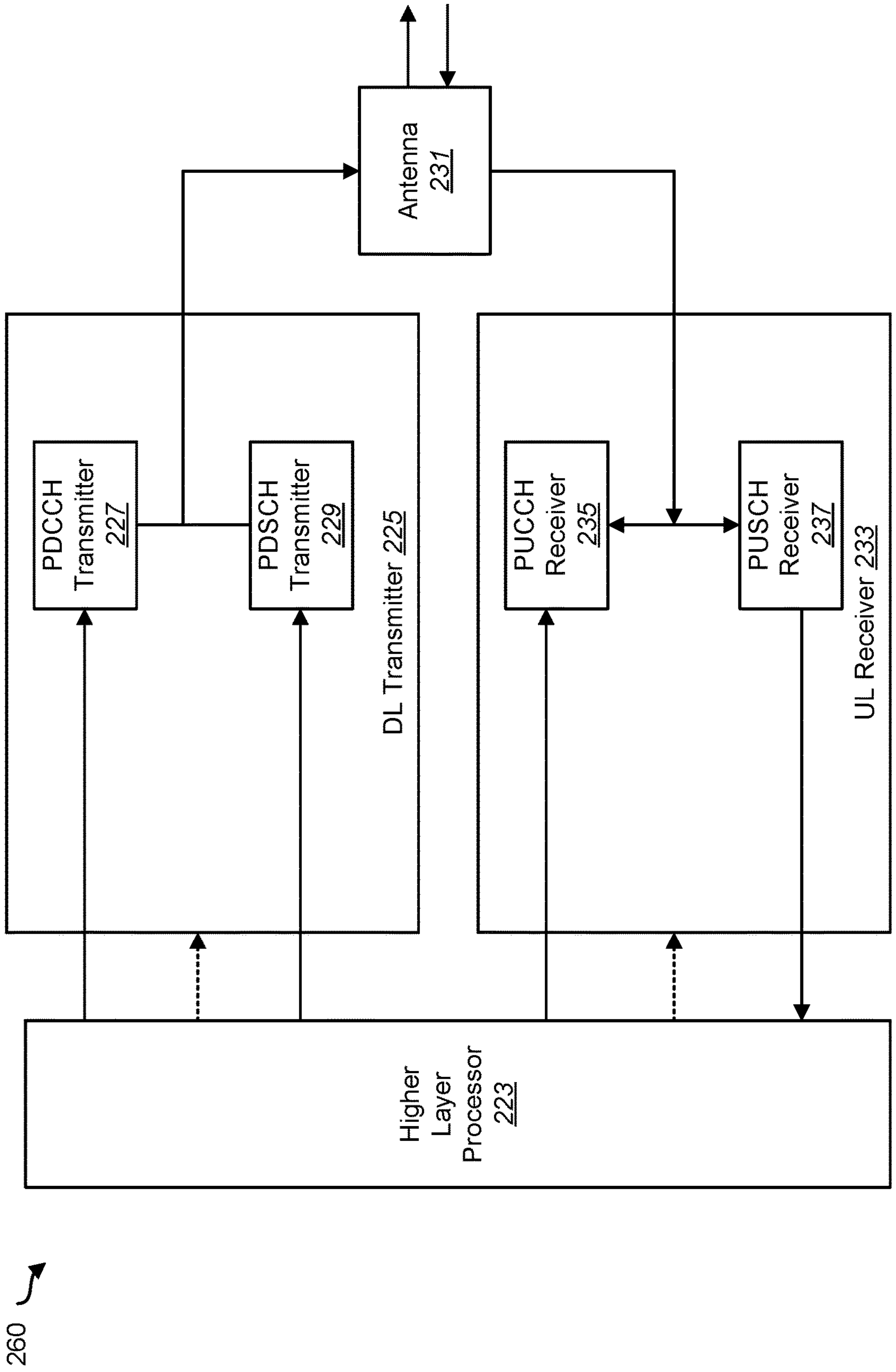
FIG. 15 is a block diagram illustrating one implementation of a base station.

FIG. 15 is a block diagram illustrating one example implementation of a base station device 260. The base station device 260 embodiment may be implemented in accordance with the base station device described in connection with other examples (e.g., the base station device 102) herein, and/or may perform one or more of the functions described herein. The base station device 260 may include a higher layer processor 223, a DL transmitter 225, a UL receiver 233, and one or more antenna 231. The DL transmitter 225 may include a PDCCH transmitter 227 and a PDSCH transmitter 229. The UL receiver 233 may include a PUCCH receiver 235 and a PUSCH receiver 237.

The higher layer processor 223 may manage physical layer's behaviors (the DL transmitter's and the UL receiver's behaviors) and provide higher layer parameters to the physical layer. The higher layer processor 223 may obtain transport blocks from the physical layer. The higher layer processor 223 may send/acquire higher layer messages such as an RRC message and MAC message to/from a UE's higher layer. The higher layer processor 223 may provide the PDSCH transmitter transport blocks and provide the PDCCH transmitter transmission parameters related to the transport blocks and/or the PDSCH. In another example, the higher layer processor 223 may provide the PDSCH transmitter transport blocks and the DL transmitter 225 may generate the PDCCH transmitter transmission parameters related to the transport blocks and/or the PDSCH.

The DL transmitter 225 may multiplex downlink physical channels and downlink physical signals (including reservation signal) and transmit them via transmission antennas 231. The UL receiver 233 may receive multiplexed uplink physical channels and uplink physical signals via receiving antennas 231 and de-multiplex them. The PUCCH receiver 235 may provide the higher layer processor 223 UCI. The PUSCH receiver 237 may provide the higher layer processor 223 received transport blocks.

Figure 16:
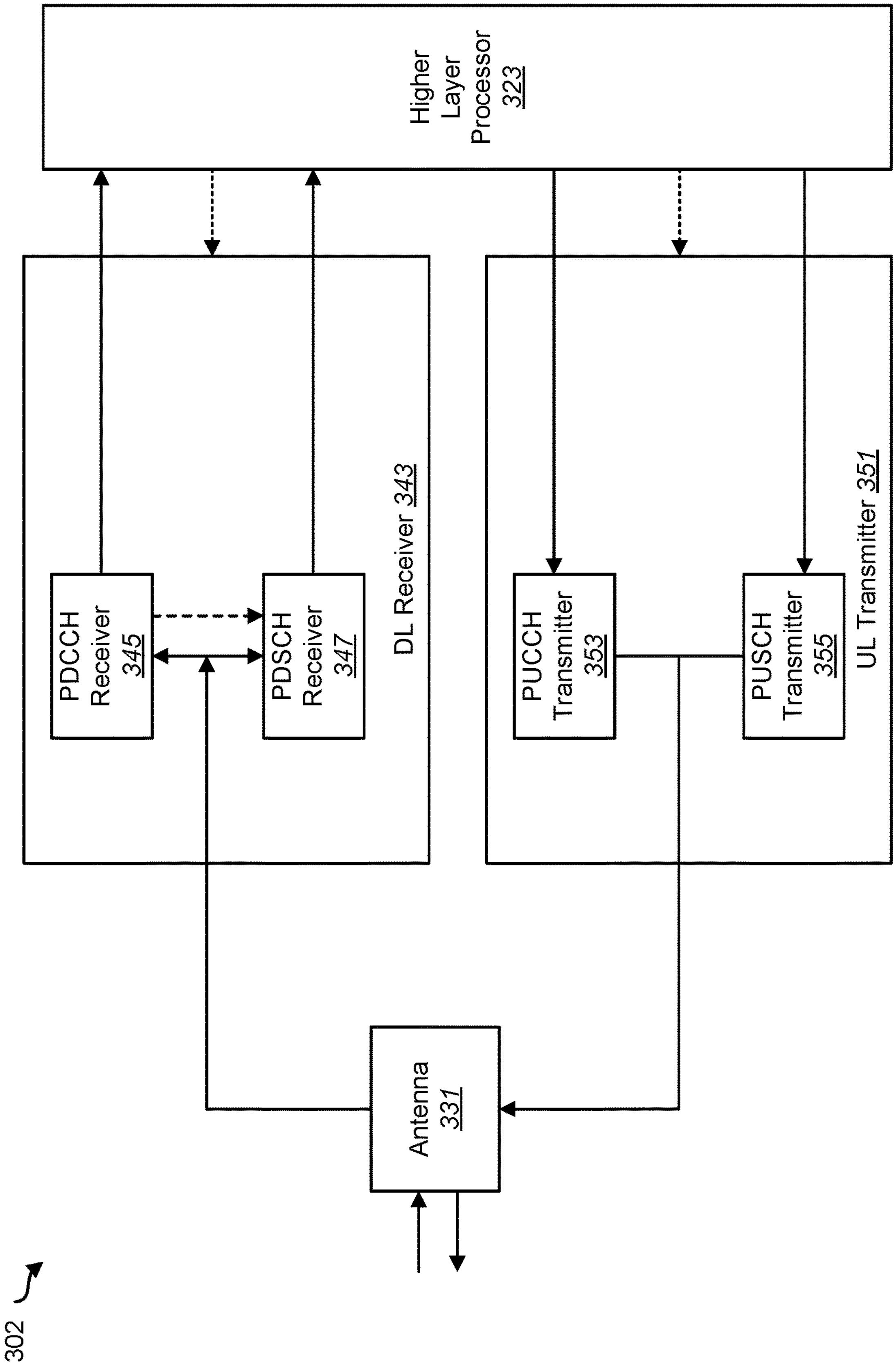
FIG. 16 is a block diagram illustrating one implementation of a terminal device.

FIG. 16 is a block diagram illustrating one example implementation of a terminal device 302. The terminal device 302 embodiment may be implemented in accordance with the terminal device described in connection with other examples (e.g., the terminal device 101) herein, and/or may perform one or more of the functions described herein. The terminal device 302 may include a higher layer processor 323, a UL transmitter 351, a DL receiver 343, and one or more antenna 331. The UL transmitter 351 may include a PUCCH transmitter 353 and a PUSCH transmitter 355. The DL receiver 343 may include a PDCCH receiver 345 and a PDSCH receiver 347.

The higher layer processor 323 may manage physical layer's behaviors (the UL transmitter's and the DL receiver's behaviors) and provide higher layer parameters to the physical layer. The higher layer processor 323 may obtain transport blocks from the physical layer. The higher layer processor 323 may send/acquire higher layer messages such as an RRC message and MAC message to/from a UE's higher layer. The higher layer processor 323 may provide the PUSCH transmitter transport blocks and provide the PUCCH transmitter 353 UCI. In another example, the higher layer processor 323 may provide the PUSCH transmitter transport blocks and the UL transmitter 351 may generate UCI.

The DL receiver 343 may receive multiplexed downlink physical channels and downlink physical signals via receiving antennas 331 and de-multiplex them. The PDCCH receiver 345 may provide the higher layer processor 323 DCI. The PDSCH receiver 347 may provide the higher layer processor 323 received transport blocks.

It should be noted that names of physical channels described herein are examples. The other names such as "NRPDCCH, NRPDSCH, NRPUCCH and NRPUSCH", "new Generation-(G) PDCCH, GPDSCH, GPUCCH and GPUSCH" or the like can be used.

Figure 17:
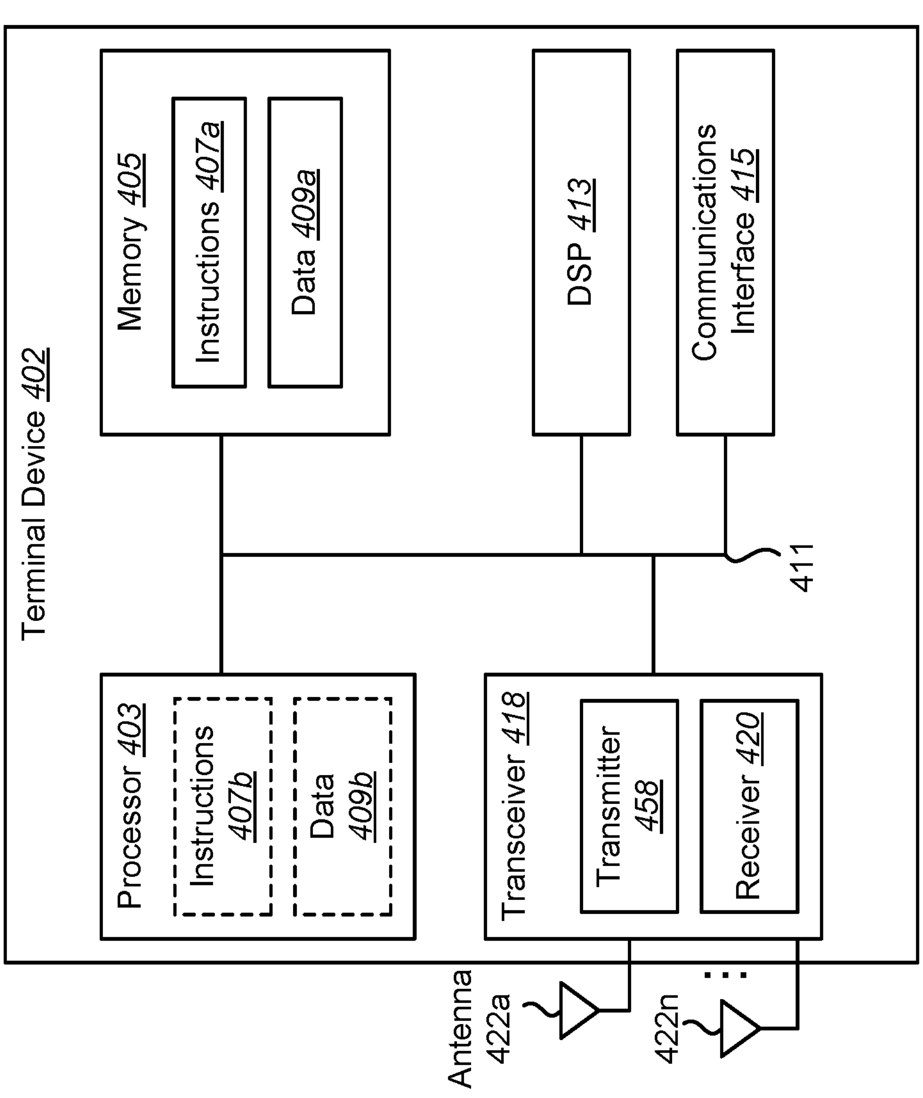
FIG. 17 illustrates various components that may be utilized in a terminal device.

FIG. 17 is a block diagram illustrating one example implementation of a terminal device 402. The terminal device 402 embodiment may be implemented in accordance with the terminal device described in connection with other examples (e.g., the terminal device 101) herein, and/or may perform one or more of the functions described herein. The terminal device 402 includes a processor 403 that controls operation of the terminal device 402. The processor 403 may also be referred to as a central processing unit (CPU). Memory 405, which may include read-only memory (ROM), random access memory (RAM), a combination of the two or any type of device that may store information, provides instructions 407*a* and data 409*a* to the processor 403. A portion of the memory 405 may also include non-volatile random-access memory (NVRAM). Instructions 407*b* and data 409*b* may also reside in the processor 403. Instructions 407*b* and/or data 409*b* loaded into the processor 403 may also include instructions 407*a* and/or data 409*a* from memory 405 that were loaded for execution or processing by the processor 403. The instructions 407*b* may be executed by the processor 403 to implement the methods described above.

The terminal device 402 may also include a housing that contains one or more transmitters 458 and one or more receivers 420 to allow transmission and reception of data. The transmitter(s) 458 and receiver(s) 420 may be combined into one or more transceivers 418. One or more antennas 422*a-n* are attached to the housing and electrically coupled to the transceiver 418.

The various components of the terminal device 402 are coupled together by a bus system 411, which may include a power bus, a control signal bus, and a status signal bus, in addition to a data bus. However, for the sake of clarity, the various buses are illustrated in FIG. 17 as the bus system 411. The terminal device 402 may also include a digital signal processor (DSP) 413 for use in processing signals. The terminal device 402 may also include a communications interface 415 that provides user access to the functions of the terminal device 402. The terminal device 402 illustrated in FIG. 17 is a functional block diagram rather than a listing of specific components.

Figure 18:
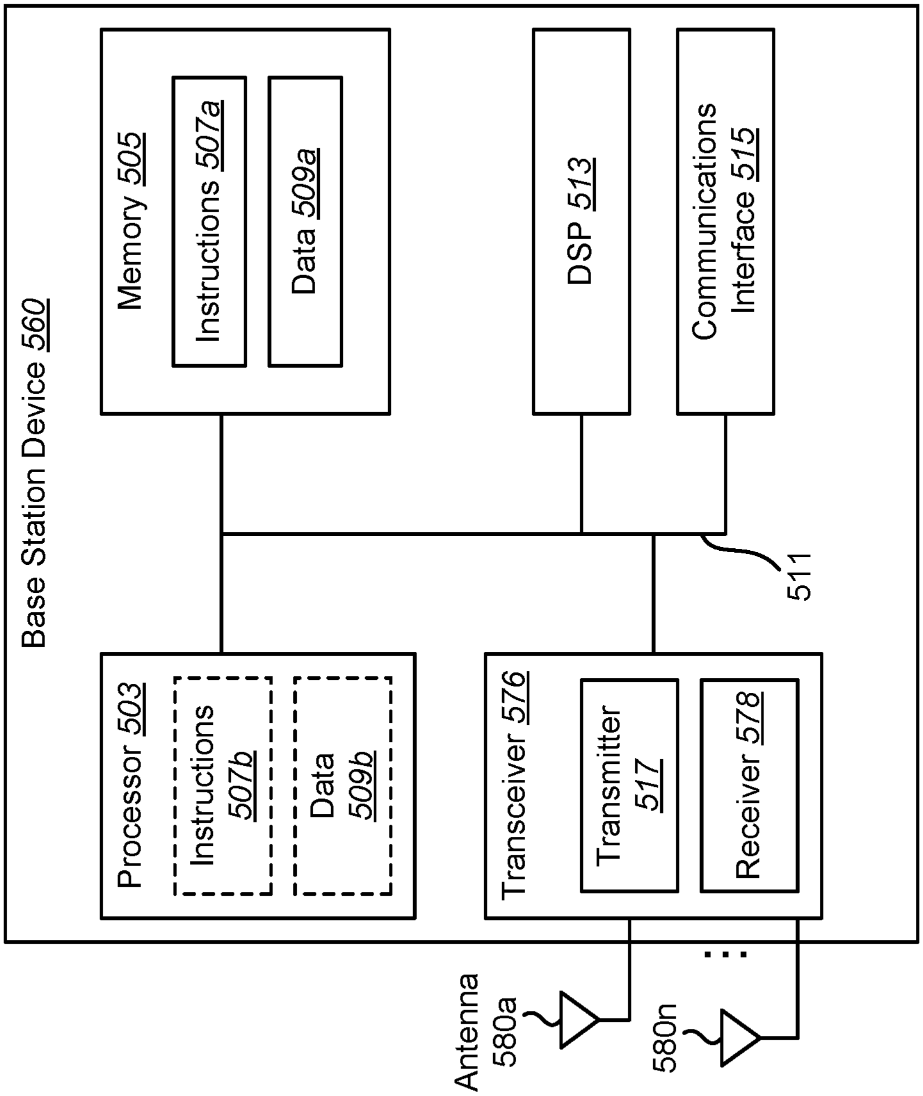
FIG. 18 illustrates various components that may be utilized in a base station.

FIG. 18 is a block diagram illustrating one example implementation of a base station device 560. The base station device 560 embodiment may be implemented in accordance with the base station device described in connection with other examples (e.g., the base station device 102) herein, and/or may perform one or more of the functions described herein. The base station device 560 includes a processor 503 that controls operation of the base station device 560. The processor 503 may also be referred to as a central processing unit (CPU). Memory 505, which may include read-only memory (ROM), random access memory (RAM), a combination of the two or any type of device that may store information, provides instructions 507*a* and data 509*a* to the processor 503. A portion of the memory 505 may also include non-volatile random-access memory (NVRAM). Instructions 507*b* and data 509*b* may also reside in the processor 503. Instructions 507*b* and/or data 509*b* loaded into the processor 503 may also include instructions 507*a* and/or data 509*a* from memory 505 that were loaded for execution or processing by the processor 503. The instructions 507*b* may be executed by the processor 503 to implement the methods described above.

The base station device 560 may also include a housing that contains one or more transmitters 517 and one or more receivers 578 to allow transmission and reception of data. The transmitter(s) 517 and receiver(s) 578 may be combined into one or more transceivers 576. One or more antennas 580*a-n* are attached to the housing and electrically coupled to the transceiver 576.

The various components of the base station device 560 are coupled together by a bus system 511, which may include a power bus, a control signal bus, and a status signal bus, in addition to a data bus. However, for the sake of clarity, the various buses are illustrated in FIG. 18 as the bus system 511. The base station device 560 may also include a digital signal processor (DSP) 513 for use in processing signals. The base station device 560 may also include a communications interface 515 that provides user access to the functions of the base station device 560. The base station device 560 illustrated in FIG. 18 is a functional block diagram rather than a listing of specific components.

Figure 19:
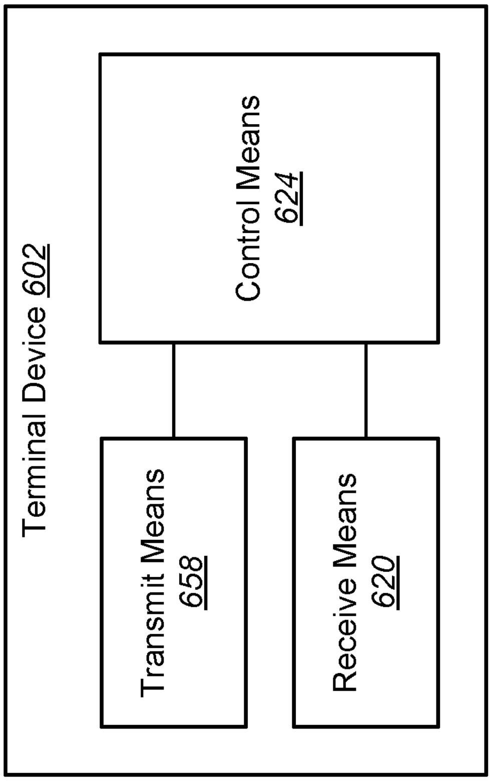
FIG. 19 is a block diagram illustrating one implementation of a terminal device in which the systems and methods described herein may be implemented.

FIG. 19 is a block diagram illustrating one example implementation of a terminal device 602. The terminal device 602 embodiment may be implemented in accordance with the terminal device described in connection with other examples (e.g., the terminal device 101) herein, and/or may perform one or more of the functions described herein. The terminal device 602 includes transmit means 658, receive means 620 and control means 624. The transmit means 658, receive means 620 and control means 624 may be configured to perform one or more of the functions described in connection with other examples herein. FIG. 17 above illustrates one example of a concrete apparatus structure of FIG. 19. Other various structures may be implemented to realize one or more of the functions described herein. For example, a DSP may be realized by software.

Figure 20:
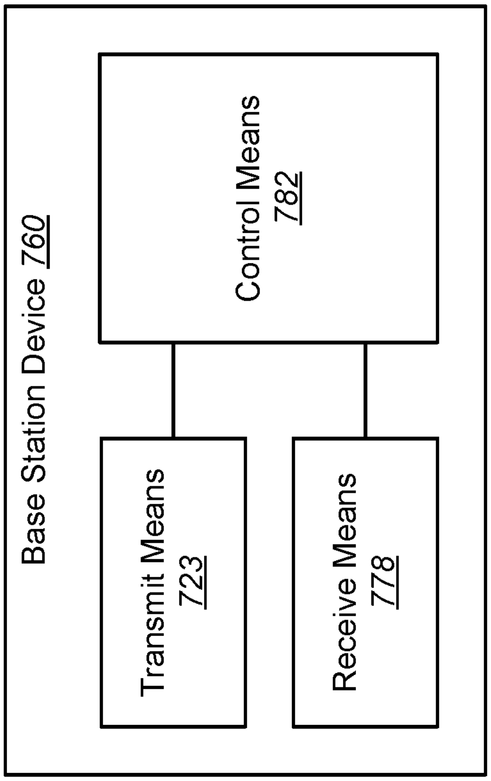
FIG. 20 is a block diagram illustrating one implementation of a base station in which the systems and methods described herein may be implemented.

FIG. 20 is a block diagram illustrating one example implementation of a base station device 760. The base station device 760 embodiment may be implemented in accordance with the base station device described in connection with other examples (e.g., the base station device 102) herein, and/or may perform one or more of the functions described herein. The base station device 760 includes transmit means 723, receive means 778 and control means 782. The transmit means 723, receive means 778 and control means 782 may be configured to perform one or more of the functions described in connection with other examples herein. FIG. 18 above illustrates one example of a concrete apparatus structure of FIG. 20. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the base station or the terminal device according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the base station devices and the terminal devices according to the systems and methods described above may be realized as an LSI that is a typical integrated circuit. Each functional block of the base station device and the terminal device may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term “and/or” should be interpreted to mean one or more items. For example, the phrase “A, B, and/or C” should be interpreted to mean any of: only A, only B, only C, A and B (but not C), B and C (but not A), A and C (but not B), or all of A, B, and C. As used herein, the phrase “at least one of” should be interpreted to mean one or more items. For example, the phrase “at least one of A, B and C” or the phrase “at least one of A, B or C” should be interpreted to mean any of: only A, only B, only C. A and B (but not C), B and C (but not A), A and C (but not B), or all of A, B, and C. As used herein, the phrase “one or more of” should be interpreted to mean one or more items. For example, the phrase “one or more of A, B and C” or the phrase “one or more of A, B or C” should be interpreted to mean any of: only A, only B, only C, A and B (but not C), B and C (but not A), A and C (but not B), or all of A, B, and C.

What is claimed is:

1. A wireless terminal of a cellular telecommunication system, the wireless terminal comprising:

reception circuitry configured to configure a plurality of bandwidth parts (BWPs), wherein each BWP corresponds to one of a plurality of subcarrier spacing (SCS)-specific carriers;

processing circuitry configured to determine each uplink (UL) subband of a plurality of UL subbands for each SCS-specific carrier; and transmission circuitry configured to transmit UL channels in an active BWP of the plurality of BWPs, wherein the UL channels are within one UL subband of the plurality of UL subbands, the plurality of UL subbands are configured in a downlink region of a time division duplex (TDD) pattern.

2. A base station apparatus of a cellular telecommunication system, the base station apparatus comprising:

transmission circuitry configured to configure a plurality of bandwidth parts (BWPs), wherein each BWP corresponds to one of a plurality of subcarrier spacing (SCS)-specific carriers;

processing circuitry configured to determine each uplink (UL) subband of a plurality of UL subbands for each SCS-specific carrier; and reception circuitry configured to receive UL channels in an active BWP of the plurality of BWPs, wherein the UL channels are within one UL subband of the plurality of UL subbands, the plurality of UL subbands are configured in a downlink region of a time division duplex (TDD) pattern.

3. A method by a wireless terminal of a cellular telecommunication system, the method comprising:

configuring a plurality of bandwidth parts (BWPs), wherein each BWP corresponds to one of a plurality of subcarrier spacing (SCS)-specific carriers;

determining each uplink (UL) subband of a plurality of UL subbands, for each SCS-specific carrier; and transmitting UL channels in an active BWP of the plurality of BWPs, wherein the UL channels are within one UL subband of the plurality of UL subbands, the plurality of UL subbands are configured in a downlink region of a time division duplex (TDD) pattern.

* * * * *